US012646016B2

(12) United States Patent
Singh et al.

(10) Patent No.: US 12,646,016 B2
(45) Date of Patent: Jun. 2, 2026

(54) WAREHOUSE ORDER PICKING OPTIMIZATION SYSTEM AND METHOD

(71) Applicant: Exel Inc., Westerville, OH (US)

(72) Inventors: Manjeet Singh, Columbus, OH (US);
Siqiang Guo, Westerville, OH (US);
Bocheng Yu, Westerville, OH (US);
Adrian Kumar, Columbus, OH (US);
Saman Saiy, Mississauga (CA)

(73) Assignee: Exel Inc., Westerville, OH (US)

( * ) Notice: Subject to any disclaimer, the term of this patent is extended or adjusted under 35 U.S.C. 154(b) by 135 days.

(21) Appl. No.: 18/901,361

(22) Filed: Sep. 30, 2024

(65) Prior Publication Data

US 2025/0021898 A1     Jan. 16, 2025

Related U.S. Application Data

(63) Continuation of application No. 18/520,335, filed on Nov. 27, 2023, now Pat. No. 12,106,236, which is a continuation of application No. 17/459,595, filed on Aug. 27, 2021, now Pat. No. 11,829,908, which is a continuation-in-part of application No. 16/599,934, filed on Oct. 11, 2019, now abandoned.

(51) Int. Cl.

| | |
|---|---|
| *G06Q 10/04* | (2023.01) |
| *B65G 1/137* | (2006.01) |
| *G06F 18/2115* | (2023.01) |
| *G06F 18/2413* | (2023.01) |
| *G06Q 10/08* | (2024.01) |
| *G06Q 10/0875* | (2023.01) |

(52) U.S. Cl.
CPC ........... *G06Q 10/04* (2013.01); *B65G 1/1371* (2013.01); *B65G 1/1373* (2013.01); *G06F*

*18/2115* (2023.01); *G06F 18/24147* (2023.01); *G06Q 10/08* (2013.01); *G06Q 10/0875* (2013.01)

(58) Field of Classification Search
CPC .... G06Q 10/04; G06Q 10/08; G06Q 10/0875; G06Q 10/06311; G06Q 30/0635; G06Q 10/047; B65G 1/1371; B65G 1/1373; G06F 18/2115; G06F 18/24147
See application file for complete search history.

(56) References Cited

U.S. PATENT DOCUMENTS

| | | | |
|---|---|---|---|
| 2003/0105552 A1* | 6/2003 | Lunak ..................... | G07F 11/42 |
| | | | 700/214 |
| 2014/0040075 A1 | 2/2014 | Perry et al. | |
| 2019/0049975 A1* | 2/2019 | Kattepur .......... | G05B 19/41865 |
| 2019/0138978 A1 | 5/2019 | Johnson et al. | |
| 2020/0272970 A1 | 8/2020 | Willard, III et al. | |

OTHER PUBLICATIONS

Rethink Robotics, Sawyer Black Edition, https://www.rethinkrobotics.com/sawyer/.
Ocado, How many robots does it take to run a grocery store?, https://www.youtube.com/watch?v=ssZ_8cqfBIE&t=1s, Jul. 5, 2021.

* cited by examiner

*Primary Examiner* — A. Hunter Wilder
(74) *Attorney, Agent, or Firm* — Standley Law Group LLP; Beverly A. Marsh; Kenny W. Pung

(57) ABSTRACT

Exemplary system and method embodiments described and shown herein are directed to optimizing warehouse picking operations. Exemplary system and method embodiments employ order allocation optimization and/or order grouping optimization that are individually or collectively usable to allocate and group warehouse orders in a manner that minimizes picker travel and maximizes labor productivity.

20 Claims, 14 Drawing Sheets

I.D E.A. WAVING LOGIC ORDER GROUPING

Aisle1   Aisle2   Aisle3   Aisle4   Aisle5   Aisle6

SKUs FOR ORDERS 01 TO O16
SHOWN IN FIGURE ON LEFT

SKUs/ORDER = 2

OPTIMAL PICK ASSIGNMENT

• ORDERS ASSIGNED = 1,2,7,9,11,15

• NUMBER OF AISLES VISITED = 2

OFFICE NETWORK

CEO

MANAGER

OPERATOR

OPERATOR

ERP SERVERS

WAREHOUSE PICKING OPTIMIZATION SYSTEM

WMS SERVER

MANAGER

WAREHOUSE NETWORK

SCANNER AND PRINTER

SHIPPING

SCANNER AND PRINTER

INVENTORY

SCANNER AND PRINTER

RECEIVING

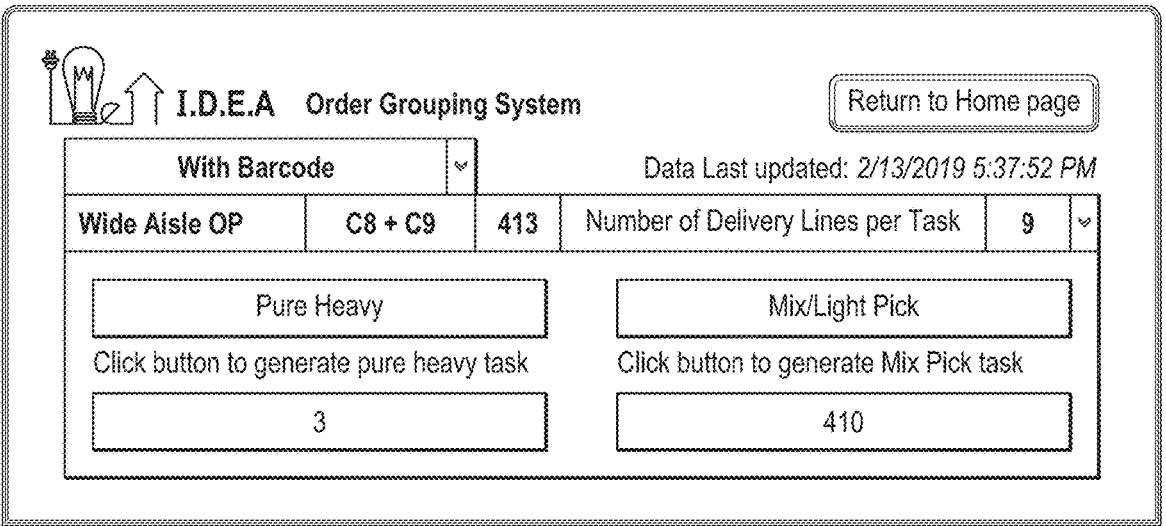

I.D.E.A   Order Grouping System

Return to Home page

With Barcode

Data Last updated: 2/13/2019 5:37:52 PM

| Wide Aisle OP | C8 + C9 | 413 | Number of Delivery Lines per Task | 9 |

| Pure Heavy | Mix/Light Pick |
| Click button to generate pure heavy task | Click button to generate Mix Pick task |
| 3 | 410 |

FIG. 9

All Open Orders/Picks:                    130/236

Last Order Update:          07/16/19 15:35:06                    Refresh

Criticality 1

Orders/Picks:

78/134

Check

Criticality 2

Orders/Picks:

20/43

Check

Criticality 3

Orders/Picks:

32/59

Check

FIG. 10

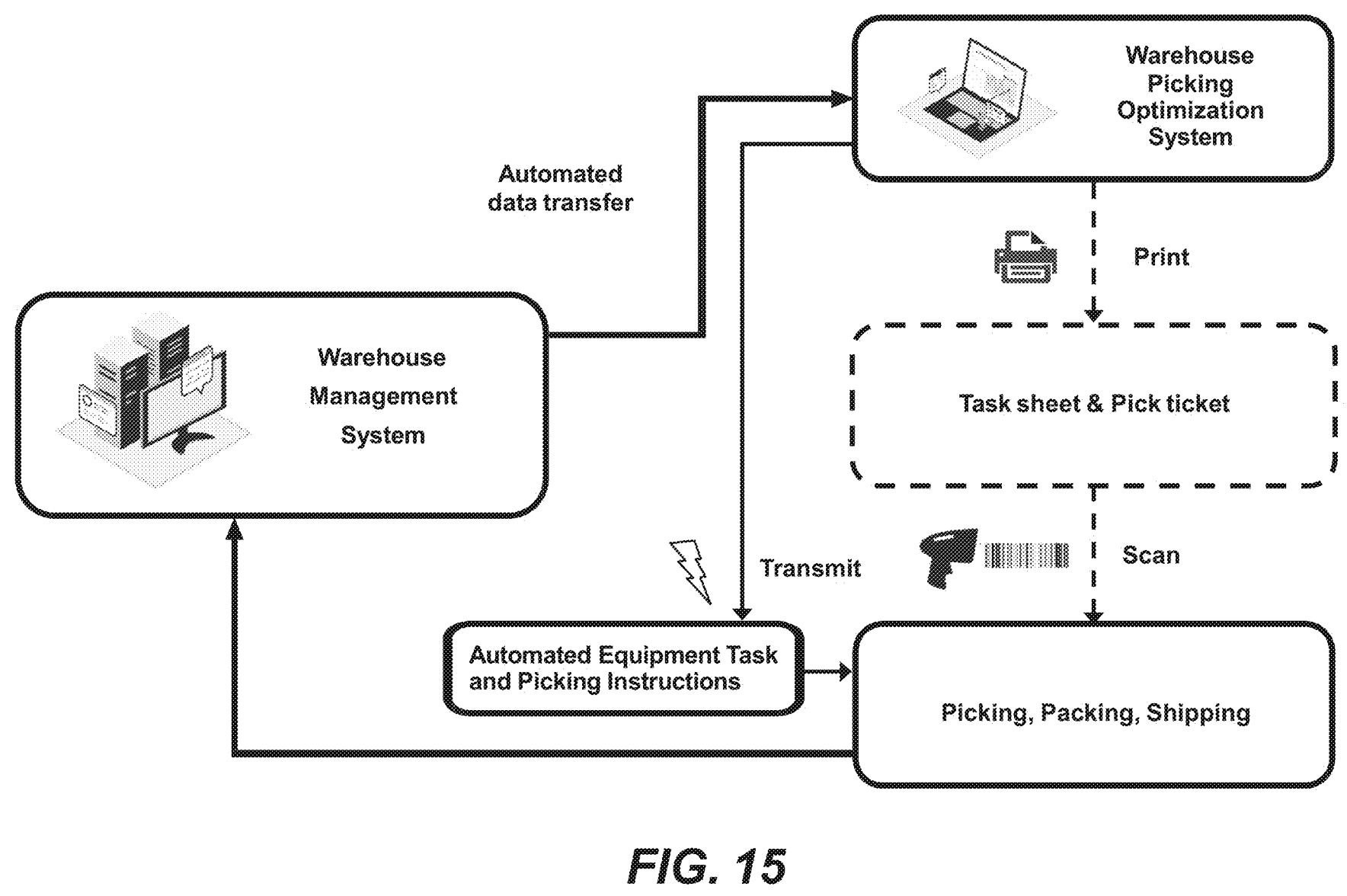

Warehouse Picking Optimization System

Print

Task sheet & Pick ticket

Scan

Picking, Packing, Shipping

Transmit

Automated Equipment Task and Picking Instructions

Automated data transfer

Warehouse Management System

*FIG. 15*

WAREHOUSE ORDER PICKING OPTIMIZATION SYSTEM AND METHOD

CROSS-REFERENCE TO RELATED APPLICATIONS

This application is a continuation of U.S. application Ser. No. 18/520,335 filed on Nov. 27, 2023 which is a continuation of U.S. application Ser. No. 17/459,595 filed on Aug. 27, 2021, which is a continuation-in-part of U.S. application Ser. No. 16/599,934 filed on Oct. 11, 2019, the disclosures of which are hereby incorporated by reference as if fully recited herein.

TECHNICAL FIELD

Exemplary system and method embodiments described and shown herein are directed to the optimization of warehouse picking operations through order allocation optimization and/or order grouping optimization.

BACKGROUND

There has been tremendous growth in both eCommerce logistics (i.e., logistics related to online commercial transactions) and omni-channel logistics (i.e., logistics associated with commercial transactions across an integrated and seamless mix of all contact channels). Unfortunately, this growth has resulted in increasing complexities that are outside the scope of current warehouse management system (WMS) capabilities due to a lack of intelligence and real-time control. The shortfalls in current WMS capabilities contribute to numerous warehouse inefficiencies including, but not limited to, sub-optimal labor utilization, picking strategies, cycle times, and throughput. These inefficiencies, in turn, can result in sub-optimal labor management and/or assignment, which is important given that labor constitutes approximately 40-60% of warehousing costs and a significant portion of total labor costs are due to suboptimal labor utilization.

While warehouses are increasing in complexity, customers are demanding shorter delivery times from warehouse providers. In response, average eCommerce order delivery times dropped by over 50% between 2014 and 2017 (8.3 days in 2014 versus 4.1 days in 2017). Nonetheless, labor inefficiencies challenge delivery time optimization and negatively impact customer relationships. The two key areas that lead to higher labor costs and inefficient warehouse operations are sub-optimal order allocation and sub-optimal order grouping.

The process of identifying the location of products to be picked for fulfillment of a given order is referred to in the warehouse and logistics industry as order allocation. The aforementioned problem of sub-optimal order allocation is illustrated in FIG. 1. As may be observed, current warehouses may store stock keeping units (SKUs) of given products at multiple locations. For example, a SKU of Product A is shown in FIG. 1 to be available at Zones 2, 3, 5, 7 and 11. Likewise, SKUs for Products B-D can also be picked from any one of multiple zones.

When performing order allocation for an order that includes one or more of Products A-D, current WMS logic will assign the SKU for a given product to the first location available or to a random location. Consequently, as shown in FIG. 1, a random set of product SKUs from one order may be allocated across four separate zones (e.g., 2, 1, 4, 7) even though a SKU for each of Products A-D can be picked entirely from a single zone (i.e., Zone 7 in this example).

This randomized order allocation does not consider where other SKUs of the same order are located or whether items that are typically grouped together in orders should have SKUs located closer together. The result is sub-optimal order allocation, which requires longer product pick paths, the need for a picker to visit too many zones, and a less efficient order grouping-culminating in wasted labor time through decreased labor efficiency.

Order grouping refers to the process of assigning groups of orders to order pickers. In most current warehouses, orders are grouped using a first-come first-serve system (FCFS). According to FCFS, orders are grouped together into pick assignments based on the sequence of order drop/arrival time. When a picker receives a pick assignment, the picker will pick one item at a time, moving from row to row in the warehouse in a linear fashion based on the first available SKU in the system.

Order grouping and associated product picking according to currently used order grouping strategies is illustrated in FIG. 2, where an array of six product storage aisles (Aisle 1-Aisle 6) are arranged within a warehouse. In FIG. 2, the product storage aisles are shown to include product SKUs for fulfilling sixteen different orders (designated as O1-O16), with the SKUs residing at various locations throughout the product storage aisles. As shown, Order 1 requires two SKUs, thus two orders designated as "O1" appear in FIG. 2. This pattern replicates itself with respect to orders "O2", "O3", etc.

From the sixteen orders, the aforementioned FCFS order grouping methodology results in Orders 1-6 being grouped as a single pick assignment. To fulfill this pick assignment, the assigned picker begins at the entrance to Aisle 1 (bottom-left) and travels through the necessary aisles in the picking area along a linear path. In this example, FCFS order grouping requires the picker to travel though all six product storage Aisles 1-6 in order to fulfill the six assigned orders. Thus, as demonstrated by this example, FCFS leads to inefficient pick paths and low throughput because of the extended pick path and extra travel time needed to fulfill the picking assignment. Inefficient pick paths can also lead to longer picker idle time since multiple pickers are typically operating simultaneously and the pick paths of said pickers often intersect or require the pickers to follow each other.

As should be apparent to one of skill in the art, there is significant opportunity to reduce costs in the warehousing environment by optimizing labor utilization. System and method embodiments according to the general inventive concept answer this opportunity.

SUMMARY

Broadly speaking, by improving order allocation through order allocation optimization and/or reducing picker travel paths through the use of order grouping optimization, system and method embodiments according to the general inventive concept are effective to decrease the amount of labor or machine hours required to complete a pick assignment. This results in less required picker movement, faster order picking, increased safety, decreased overtime labor hours, and cost savings. System and method embodiments according to the general inventive concept are preferably customizable, scalable across sites, modular, and inexpensive to implement.

Exemplary system and method embodiments according to the general inventive concept are usable to optimize warehouse labor requirements/costs and improve picking efficiency by eliminating the sub-optimal order grouping and sub-optimal order allocation issues described above. An exemplary system and method embodiment will typically include an order allocation optimization (OAO) module and an order grouping optimization (OGO) module. Each module may utilize information available from the existing WMS at a given site of interest. Order allocation optimization and order grouping optimization concepts/modules may be used together, based on the needs of the site and the complexity thereof.

Exemplary order allocation optimization and order grouping optimization modules may be integrated into the existing WMS of a given site. Integration may occur in a variety of ways including, without limitation, via manual extraction, WMS API's, and external tools. In any case, order allocation optimization and order grouping optimization will make use of a variety of different data. Exemplary data (which may be obtained from an existing WMS) may include, for example, order file data, item master data and location master data.

Other aspects and features of the general inventive concept will become apparent to those skilled in the art upon review of the following detailed description of exemplary embodiments along with the accompanying drawing figures.

BRIEF DESCRIPTION OF THE DRAWINGS

In the following descriptions of the drawings and exemplary embodiments, like reference numerals across the several views refer to identical or equivalent features, and:

FIG. 9 illustrates how orders can be further separated based on storage zone and required material handling equipment before order grouping optimization is applied;

FIG. 10 illustrates how orders can also be separated based on criticality before order grouping optimization is applied;

FIG. 15 is a graphical representation of still another exemplary warehouse order picking optimization process according to the general inventive concept.

DETAILED DESCRIPTION OF THE
EXEMPLARY EMBODIMENTS

As explained briefly above, exemplary system and method embodiments of the general inventive concept are usable to optimize warehouse picking through optimization of order allocation and/or order grouping. Order allocation optimization involves consideration of all locations of each SKU applicable to each order to determine and assign the most optimal product pick location. The use of order allocation optimization results in minimization of the number of areas and zones of a warehouse of interest that must be visited by a picker in order to complete an order. Order allocation optimization is particularly effective when used at complex warehouse sites where one SKU is stored in multiple locations, because without order allocation optimization, a known WMS will normally employ a "first location rule" order allocation methodology that gives allocation priority to the first location of each SKU until that location has been fully picked (is empty) and then moves on to the next location of the SKU until that location has been fully picked (and so forth).

The order allocation optimization methodology may review a variety of different data, which may be obtained from an existing WMS. Exemplary data that may be reviewed during the order allocation optimization process may include, for example, order file data such as but not limited to order number, SKU number and SKU quantity. Additionally, order allocation may also look at the active inventory file that contains SKU number, SKU number location and the actual quantity of SKUs available in inventory.

The order allocation optimization process analyzes said data and determines which products should be picked from which SKU location to optimize the associated pick path. An exemplary order allocation optimization methodology may be based on order data (e.g., order number, SKU, quantity) and location master data (e.g., SKU, location, quantity). The analysis for each order is independent. That is, there is no interaction between the analyses for different orders. There is also no requirement for simulation(s) prior to execution.

The order allocation optimization process may also review each order generally, to identify a zone in which the most items of the total number of items in a given order may be found and picked. After identifying said zone, order allocation optimization is performed again on any remaining items to identify a zone in which the most items of the total number of remaining items in the order may be found and picked. This process is repeated until all of the items in the order are allocated to the order (i.e., until the order is filled).

Figure 1:
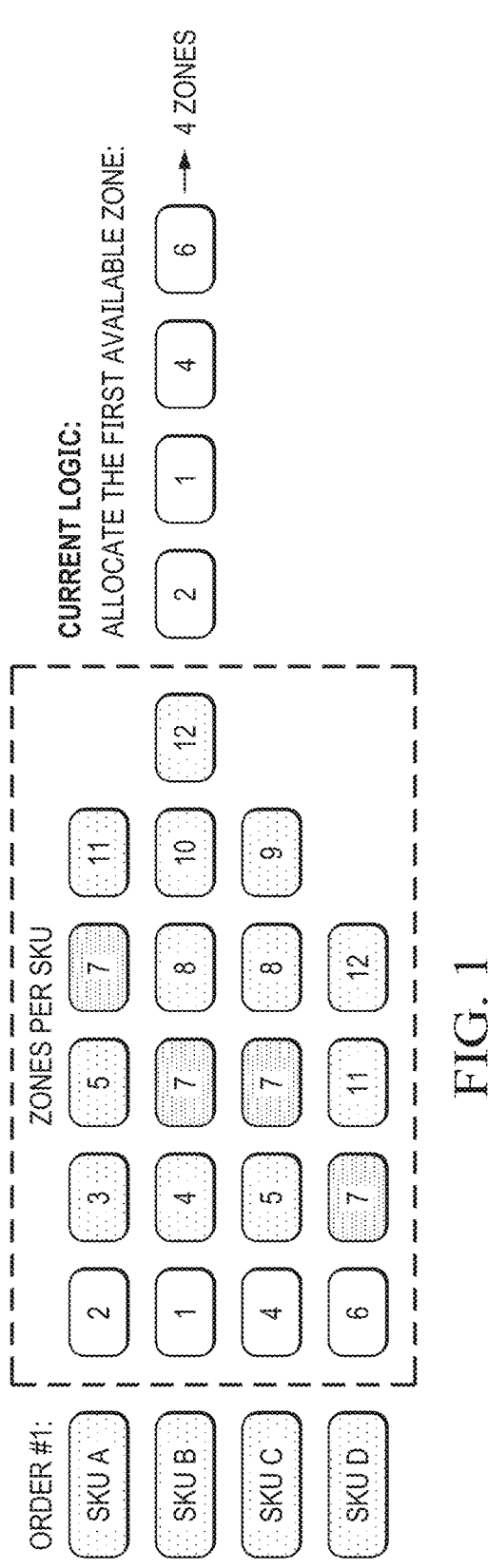
FIG. 1 illustrates currently used sub-optimal warehousing order allocation methodologies.
Figure 3:
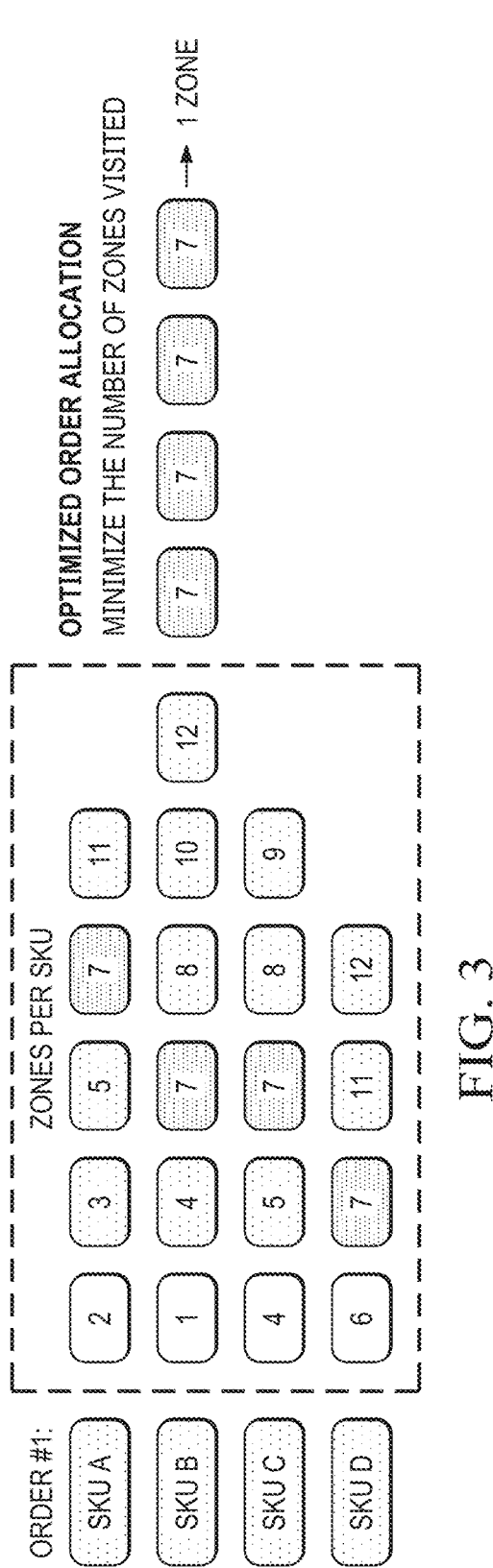
FIG. 3 represents improvement in order allocation that may be achieved when replacing the sub-optimal order allocation methodology illustrated in FIG. 1 with an exemplary order allocation optimization methodology according to the general inventive concept.

The result of applying an exemplary order allocation optimization methodology to an exemplary order is represented in FIG. 3. More particularly, FIG. 3 shows the improvement in order allocation that may be achieved when replacing the sub-optimal order allocation methodology illustrated in FIG. 1 with an exemplary order allocation optimization methodology according to the general inventive. As may be observed, the requirement for a picker to navigate four zones when filling an exemplary order containing four SKUs according to the sub-optimal order allocation represented in FIG. 1 is reduced only a single zone (Zone 7) by utilizing an exemplary order allocation optimization process according to the general inventive concept.

An exemplary order allocation optimization process according to the general inventive concept is preferably heuristic in nature. As mentioned above, an exemplary order allocation optimization process may utilize two data inputs: an active inventory file, which indicates the quantity of items by location according to SKU; and an order file, which indicates the quantity of SKUs required by each order. The order allocation optimization methodology may allocate a plurality of orders one-by-one according to the sequence of the orders in the associated order file. The use of other input data may be possible in other embodiments.

Preferably, the success or failure of allocating a prior order has no effect on the attempted allocation of a subsequent order. That is, the order allocation optimization process will preferably successively attempt to optimize all of the orders of a plurality of orders even if the allocation process relative to a prior order was unsuccessful. In such a case, the order allocation optimization process will still attempt to allocate the next order in the group of orders using the latest active inventory file logic. This process preferably continues until all of the orders are identified as being successfully allocated or as being not successfully allocated.

Successful allocation of a given order requires that the ordered quantity of each product in the order is available in the warehouse. If there is sufficient inventory available, the order allocation optimization will optimize the allocation and identify the specific location(s) from which each SKU is to be picked along with the number of SKUs that are to be picked from each identified location (when the ordered quantity of a given product is greater than one). Upon completion, the order allocation optimization process identifies the order as having been successfully allocated and the corresponding product inventory in the relevant picked location(s) is adjusted in the active inventory file. If, on the other hand, there is insufficient inventory of one or more products to fulfill a given order, the order allocation optimization process will identify the order as being not successfully allocated and no adjustment to the active inventory file is made.

One exemplary embodiment of an order allocation optimization process is represented and may be executed by the following multi-step logic, where: Z=the index given to a zone in a warehouse picking area; $Z_k$=the zone of location k; $Q_{j,k}$=the quantity of SKU j in location k; $q_{i,j}$=the quantity required for SKU j by order i; Z=1, . . . , r; $Z_k$=1, . . . , r; i=1, . . . , m; j=1, . . . , n; and k=1, . . . , l.

This exemplary order allocation optimization process includes the following four steps for a given order that can be fully fulfilled based on a given active inventory file.

Step 1

For the given order i, determine the quantity of order lines covered by each zone (i.e., the SKUs in the order lines are available in any location in zone Z; denote the quantity of order lines covered by zone Z for order i as $Z^i$; and, if there is no order line left in order i, finish.

```
if no order line is left in order i:
    finish
else:
    for Z = 1 to r:
        Z^i = number of order lines covered by zone Z for order i
        go to step 2
```

Step 2

Determine the zone $Z^{i,*}$ that covers the most number of order lines in order i.

$$Z^{i,*}=\max(Z^i)$$

go to step 3

Step 3

Attempt to allocate all the order lines covered by zone $Z^{i,*}$ from order i by the available quantity of each relevant SKU in all relevant locations in zone $Z^{i,*}$.

```
if no order line that is covered by zone Z^{i,*} is left:
    go to step 1
else:
    for order line that is covered by zone Z^{i,*} in order i:
        go to step 4
```

Step 4

```
The SKU needed by this order line is SKU j.
The 1st location found for SKU j in zone Z^{i,*} is location k, mark as k_1 = k
if q_{i,j} < Q_{j,k}:
    q_{i,j} is allocated to location k for SKU j in order i
    remove this order line for SKU j in order i
    go to step 3
else if q_{i,j} = Q_{j,k}:
    q_{i,j} is allocated to location k for SKU j in order i
    remove this order line for SKU j in order i
remove location k = k_1
    go to step 3
else:
    Q_{j,k} is allocated to location k for SKU j in order i
    remove location k = k_1
    Adjust the same order line, make it require q_{i,j} − Q_{j,k} of SKU j
    go to step 4
```

Exemplary system and method embodiments of the general inventive concept may also optimize warehouse picking through order grouping optimization (OGO), which may be used in conjunction with order allocation optimization. Order grouping optimization may be used in conjunction with order allocation optimization if a given SKU is slotted in multiple locations, but may be used alone if a given SKU is only slotted in one location.

For simple sites (e.g., 1 SKU/1 location with cluster picking, medium sized warehouse), an existing WMS will typically assign orders to pickers on a first-come first-serve (FCFS) basis. Using an FCFS basis commonly results in pickers having to walk 80% of all the aisles in the given picking area to fill orders. In contrast, an exemplary order grouping optimization process will group orders so that the pick path of each individual picker is optimized. Optimization produces a shorter pick path, which leads to picks being completed faster and with less movement through the picking area and through the site.

Order grouping optimization according to the general inventive concept operates, more specifically, by generating order groups that ensure pickers will need to visit as few warehouse aisles as possible. According to the exemplary order grouping optimization process, orders are continuously evaluated as they are received at the site of interest. The order grouping optimization process can provide pick assignments to pickers based not only on when the orders are received, but also based on the most efficient orders according to SKU location. Thus, the order grouping optimization process is not constrained to follow a FCFS methodology.

The order grouping optimization process may also be customized to omit future orders from the grouping optimization analysis. For example, if constraints on the warehouse floor dictate prioritization of time-constrained items, an exemplary order grouping optimization process can optimize some number (e.g., 500) of first-received orders and ignore subsequent orders until the dictating constraint(s) is cleared. An exemplary order grouping optimization process may also be customized to group orders within time categories (e.g., orders to be fulfilled within 2 hours, 5 hours, 10 hours, etc.).

It has been experimentally determined that the use of order grouping optimization and a resultant increase in picking efficiency can reduce the number of warehouse aisles that must be visited to fulfill a given order by 40%-50% or more. This corresponds to approximately a 30% improvement in throughput over a FCFS-based system and method of order picking, which is used by most current warehouses as the standard order grouping mechanism. Order grouping optimization has such a significant impact on pick efficiency because picking usually represents around 50% to 60% of total order fulfillment time.

Figure 2:
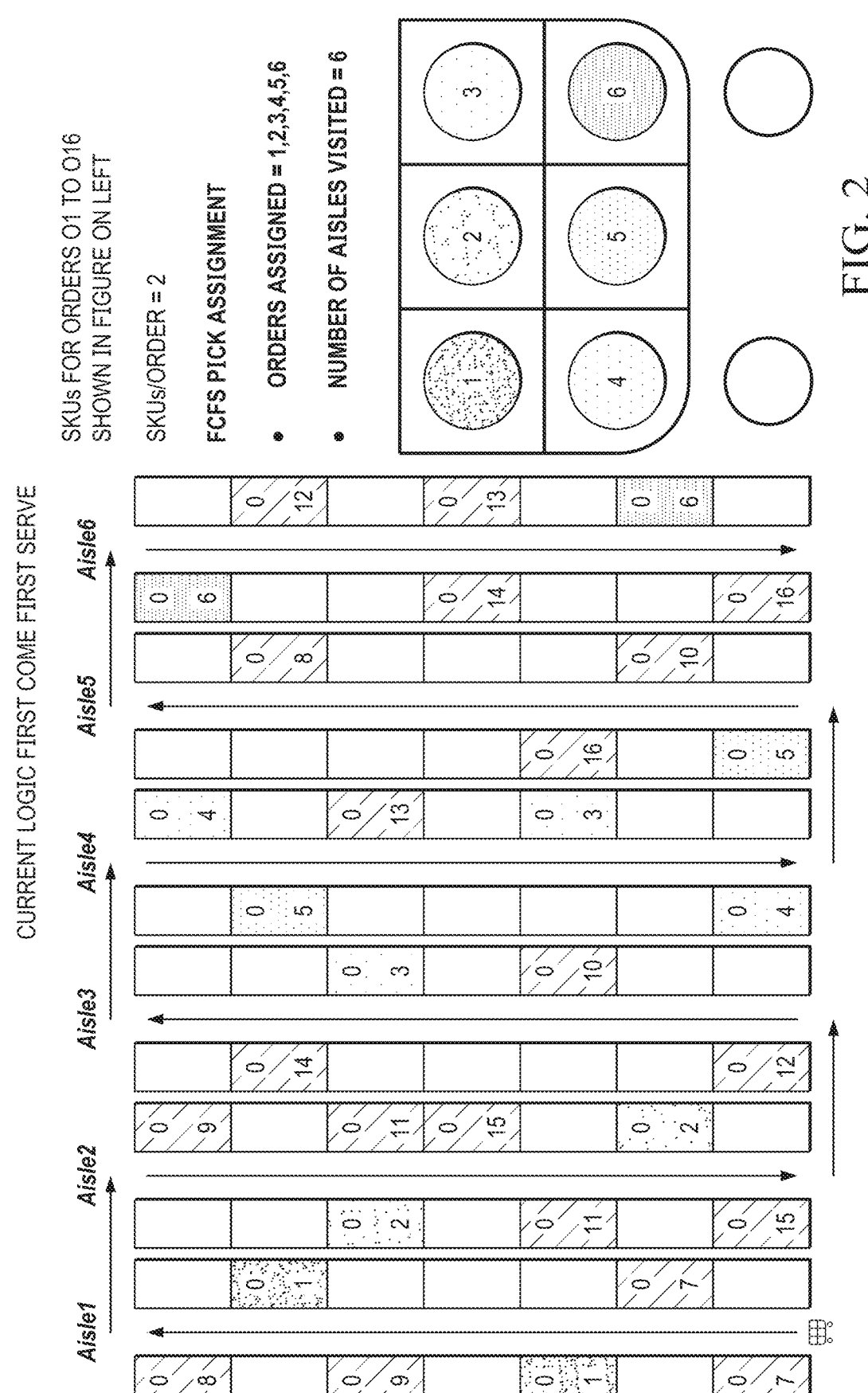
FIG. 2 illustrates currently used sub-optimal warehousing order grouping methodologies.
Figure 4:
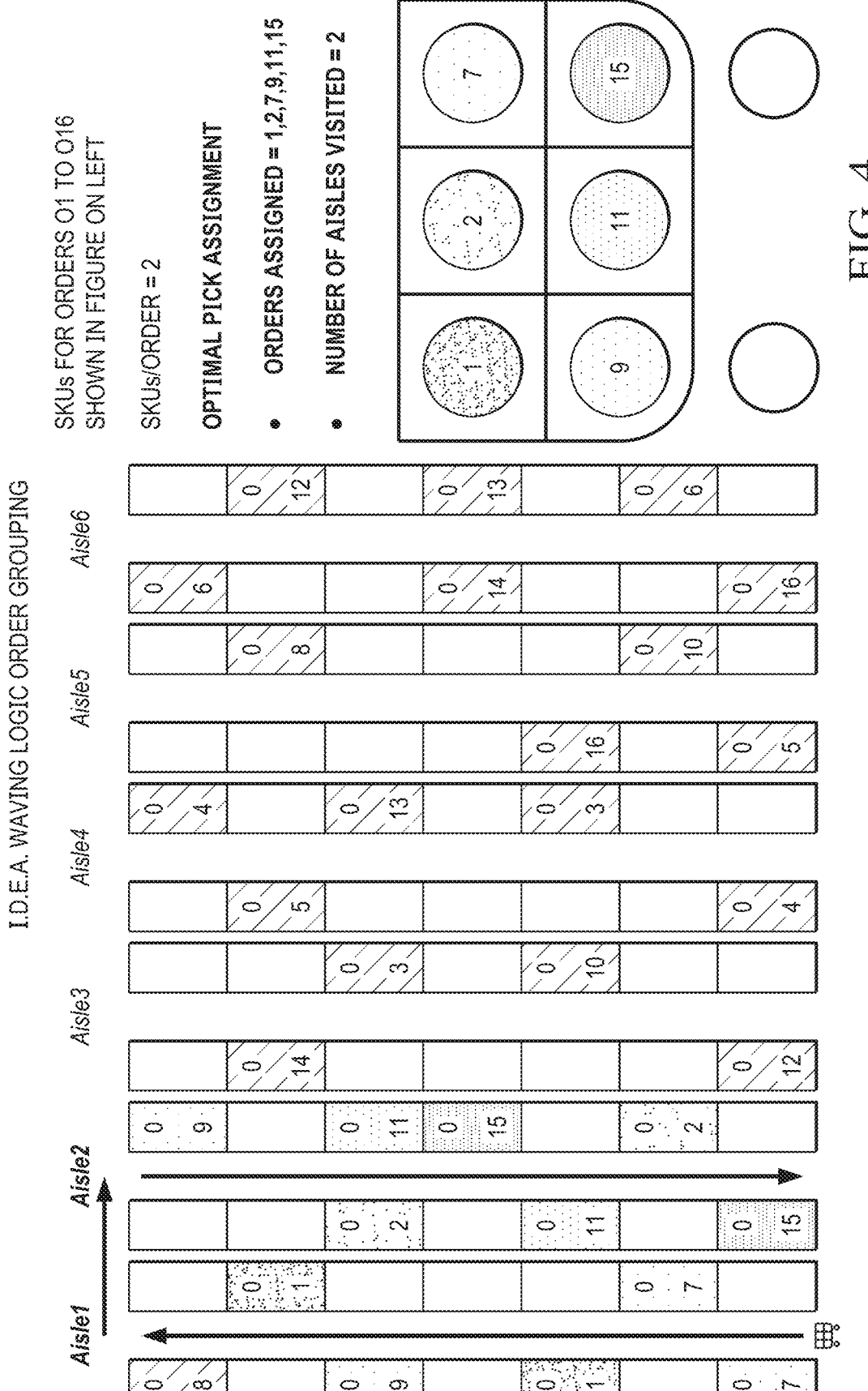
FIG. 4 represents improvement in order grouping that may be achieved when replacing the sub-optimal order grouping methodology illustrated in FIG. 2 with an exemplary order grouping optimization methodology according to the general inventive concept.

An exemplary representation of picking optimization through the use of order grouping optimization is represented in FIG. 4. As may be observed therein, the warehouse arrangement of FIG. 2 is again presented, with the same six picking aisles (Aisles 1-6) and the same arrangement of product SKUs within the six aisles. As demonstrated by FIG. 4, an exemplary order grouping optimization process can be used to assign a picker with a picking assignment comprising six orders having two SKUs per order—the same number of orders and SKUs per order that was assigned by the known system and technique represented in FIG. 2. In the example of FIG. 4, however, the use of order grouping optimization results in the picking assignment consisting of orders 1, 2, 7, 9, 11 and 15, versus orders 1, 2, 3, 4, 5 and 6 resulting from the FCFS ordering basis represented in FIG. 2. Consequently, the SKUs for all of the orders grouped via the exemplary order grouping optimization process can be picked from only two aisles (Aisles 1 and 2), while the FCFS ordering arrangement of FIG. 2 requires picking from all six aisles. As a result of the exemplary order grouping optimization process represented in FIG. 4, the number of aisles that must be picked to fulfill a given order is reduced by 66% in comparison to the number of aisles that must be picked according to the known and typical ordering basis represented in FIG. 2.

An exemplary order grouping optimization process may be based on customizable constraints, such as but not limited to, the size, shape, and weight of each SKU being picked for an order. An exemplary order grouping optimization process could, for example, use an item master to determine such constraints based on site-specific needs.

The use of customizable constraints as a basis for order grouping optimization may also help improve automated picking equipment and/or material handling equipment usage based on site availability and capacity. In this regard, an exemplary order grouping optimization process might consider the different types of material handling equipment available at a given site relative to the various product SKUs for which material handling equipment will be needed, and use said material handling equipment availability as a basis for grouping orders. Such an order grouping would reduce the possibility that pickers will need to utilize multiple pieces of material handling equipment for a single pick assignment. Likewise, an exemplary order grouping optimization process might consider different characteristics, limitations, etc., of automated picking equipment that will be used to pick or help pick orders.

Figure 5:
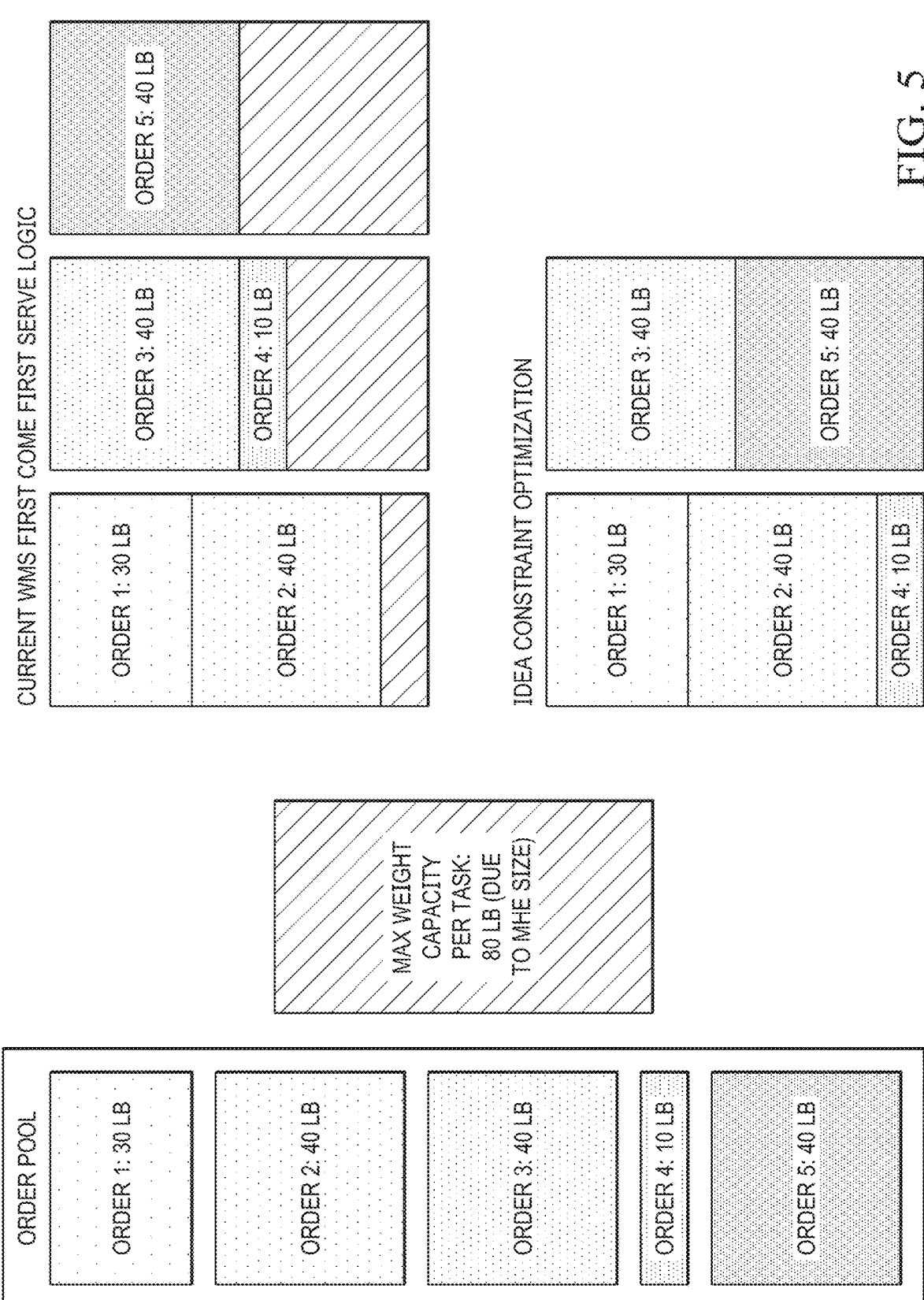
FIG. 5 illustrates how the use of an exemplary order grouping optimization methodology according to the general inventive concept may be based on customizable constraints.

FIG. 5 provides a visual illustration of applying order grouping optimization based on customizable constraints. Particularly, FIG. 5 represents an order pool containing five orders (Order 1-Order 5) with a weight constraint requirement limiting a picker to no more than 80 pounds of picked products at one time based on the material handling and/or automated picking equipment available at the warehouse. As shown at the top-right of FIG. 5, current WMS methodologies would simply assign the five orders in numerical order, meaning the picker would be forced to make three separate picking trips in order to fill all five orders while complying with the 80 pound weight constraint requirement. In contrast, by using an exemplary order grouping optimization process that considers the weight constraint requirement when determining order grouping, the five orders may be arranged in the non-sequential order of 1-2-4-3-5, which allows the picker to fill all five orders in only two trips while also complying with the 80 pound weight constraint requirement.

Another example of a site-specific constraint that may be considered by an exemplar order grouping optimization process may be present in a warehouse that contains both medical supplies and consumables (e.g., food, vitamins, beverages, etc.). As in the case of considering weight or the availability of material handling equipment as a constraint when performing order grouping optimization, an exemplary order grouping optimization process may consider that medical supplies and consumables cannot be pulled in the same pick assignment due to health concerns. For example, food products and chemical detergents should not be picked or packaged together due to the risk of detergents compromising the safety of the food products. Consequently, an exemplary order grouping optimization process may group orders in order to avoid such product groupings while still maximizing order picking efficiency.

The order grouping optimization process is accomplished by abstracting orders into multi-dimensional vectors based on the locations of the SKUs that should be picked to complete each order. The dimension of the vector is equal to the number of active pick locations and the binary value of the vector denotes the location of the picks (i.e., 0=no SKU at location; 1=SKU to be picked from location).

When grouping the first order into a task, the order grouping optimization process may also consider the density of the picks by creating a pseudo task which has one pick in the most frequently visited location of all orders, and then evaluates the similarity between orders and the task.

To navigate a warehouse, pickers must travel in one of two directions through the picking area—within/along aisles (referred to herein as "vertical" travel only for purposes of illustration and differentiation), and across aisles (referred to herein as "horizontal" travel only for purposes of illustration and differentiation). The order grouping optimization process may consider this constraint and may also employ a unique method of evaluating two multi-dimensional vectors. For example, an order grouping optimization process may consider that if a picker is required to travel from a first storage bay to a second storage bay within a single aisle during order fulfillment, picking additional items that are located between the first and second storage bays will not increase the vertical distance traveled by the picker. However, making additional picks located within the aisle but outside of the area between the first storage bay and the second storage bay will increase the vertical distance traveled by the picker.

Likewise, the order grouping optimization process may consider that if a picker travels from a first aisle to a second aisle, picking additional items that are located within the two aisles will only increase the vertical distance traveled by the picker. On the other hand, picking additional items that are located outside of the two aisles (i.e., in another aisle) will increase both the vertical and horizontal distance traveled by the picker.

Based on this basic logic, a calibration vector may be generated according to the location vector of a current task. The calibration vector has the same dimension as location vectors associated with the orders and the current task. The value of each element in the calibration vector simulates the increased travel distance if one pick at such a location is added to the current task.

The similarity between the pick locations of the current task and those of a task associated with another given order may then be calculated as the dot product of the calibration vector and the order location vector. In performing such a calculation, a storage bay is considered to be one unit and the incremental distance resulting from visiting an additional aisle is approximated by the number of storage bays present in an aisle.

In a warehousing environment, the number of units picked per hour (UPH) is a widely applied key performance indicator (KPI) for evaluating warehouse efficiency. Thus, a reward parameter $(R_l)$ may be utilized, which is a function of the number of units of $Order_l$. Utilizing such a parameter allows for assessment of the tradeoff between picking more units and the resultant increase in the travel path of the picker.

An exemplary order grouping optimization process according to the general inventive concept is preferably heuristic in nature. For warehouses where pickers pick multiple orders at a time, order grouping optimization attempts to minimize the picker travel distance by generating pick assignments (each of which contains multiple orders) whose items are located as close as possible to each other.

One exemplary embodiment of an order grouping optimization process is represented by and may be executed by the following logic which, in this particular example, is comprised of seven steps, and where: O=an order from the order pool; $A_l$=Aisle Length; $A_w$=Aisle Width; m=Number of Aisles in warehouse; and j=Index of Aisle (for example, for the aisle at the beginning left, j=1; for the aisle at the ending right, j=m.

Step 1

To generate one pick assignment, the exemplary order grouping optimization process first determines the frequency that each location (e.g., zone, area, aisle, bay, etc.) will need to be visited to pick all of the individual open orders. This typically results in one, or more than one, location being the most frequently visited location. The pick assignment—which at this point contains no actual orders—is subsequently assumed to visit the location previously determined to be the most frequently visited location. This process functionality may be represented by the following exemplary logic:

Initialize Task Aisle Location Matrix: $T_{Aisle}$, Task Bay Location Matrix: $T_{Bay}$ and pseudo order $O_{psuedo}$ for the task, where:

$T_{Aisle}=[0](m)$; and $T_{Bay}=[0](m*n)$

Denote the most visited Aisles $M_{max}$ and the most visited Bay $$N_{max}^M$$

in such

Aisle for all orders

Generate Aisle Location Matrix:

$$O_{Aisle}^{psuedo}[M_{max}] = 1$$

Generate Bay Location Matrix:

$$O_{Bay}^{psuedo}[M_{max}, N_{max}^M = 1$$

go to step 2

Step 2

After determining what will be the most frequently visited pick location, a vector is generated that calculates the additional travel distance required for any new location visit resulting from adding a new order. This process functionality may be represented by the following exemplary logic:

Generate Calibration Vector for Aisle: $C_{Aisle}$ (1*m) and Calibration Vector for Bay: $C_{Bay}$(m*n) based on $$O_{Aisle}^{psuedo}$$

and $$O_{Bay}^{psuedo}$$

```
for i = 1 to m:
    C_Aisle[i] = -(n + β * |i - M_max|)
for j = 1 to n:
    C_Bay[M_max,j] = -|j - N_max|
go to step 3
```

Step 3

Step 3 is operative to score each order by evaluating the additional travel distance when adding the order to the current pick assignment. The longer the additional travel distance, the lower the score, and vice versa. This process functionality may be represented by the following exemplary logic:

Score each order using C_Aisle and C_Bay base on O_Aisle^1 and O_Bay^1

```
〚Score〛_l=0
for i=1 to m:
    if O_Aisle^l [i]=1 and C_Aisle [i] ≠0:
        〚Score〛_l + = C_Aisle [i]
    elif O_Aisle^l [i]=1 and C_Aisle [i]=0:
        for i=1 to m:
            〚Score〛_l + = C_Bay [i,j]
    〚Score〛_l += R_l retuen
return:〚Score〛_l
go to step 4
```

Step 4

Subsequent to order scoring, the process proceeds to select the order that incurs the minimum travel distance and adds it to the current pick assignment. This process functionality may be represented by the following exemplary logic: Select the Order with highest score into current task and denote this Order as O^Best go to step 5

Step 5

Any time an order is added to the current pick assignment, the required location visits of the pick assignment are updated. This process functionality may be represented by the following exemplary logic:

Update the Task Aisle Location Matrix: T_Aisle and Task Bay Location Matrix:

```
T_Bay based on O^Best
for i=1 to m:
    if O_Aisle^Best [i]=1 and T_Aisle [i]=0:
        T_Aisle [i]=1
    for i=1 to m:
        if O_Bay^Best [i, j]=1 and T_Bay [i,j]=0:
            T_Bay [i, j]=1
    go to step 6
```

Step 6

Any time a new order is added to the current pick assignment, the vector used to calculate the additional travel distance required for any new location visit resulting from adding the new order is updated. This process functionality may be represented by the following exemplary logic:

Update Calibration Vector for Aisle $C_{Aisle}$ (1*m) and Calibration Vector for Bay $C_{Bay}$(m*n) based on $T_{Aisle}$ and $T_{Bay}$

```
i = 1, do unitll T_Aisle[i] = 1, i += 1
Aisle_left = i
i = m, do unitll T_Aisle[i] = 1, i -= 1
Aisle_right = i
for i = 1 to Aisle_left:
    C_Aisle[i] = -(n + β * |i - Aisle_left|)
for i = Aisle_left to Aisle_Right:
    if T_Aisle[i] = 1:
        C_Aisle[i] = -n
for i = Aisle_Right to m:
    C_Aisle[i] = -(n + β * |i - Aisle_Right|)
for i = 1 to m:
    if T_Aisle[i] = 1;
        j = 1, do unitll T_Bay[i, j] = 1, j += 1
        Bay_left = j
        j = n, do unitll T_Bay[i, j] = 1, j -= 1
        Bay_right = j
        for j = 1 to Bay_left:
            C_Bay[i, j] = -|i - Aisle_left|
        for j = Bay_right to n:
```

$$C_{Bay}[i, j] = -|i - Aisle_{right}|$$
go to step 7

Step 7

Repeat Steps 3-6 until the criteria of generating one task has been met.

Figure 6:
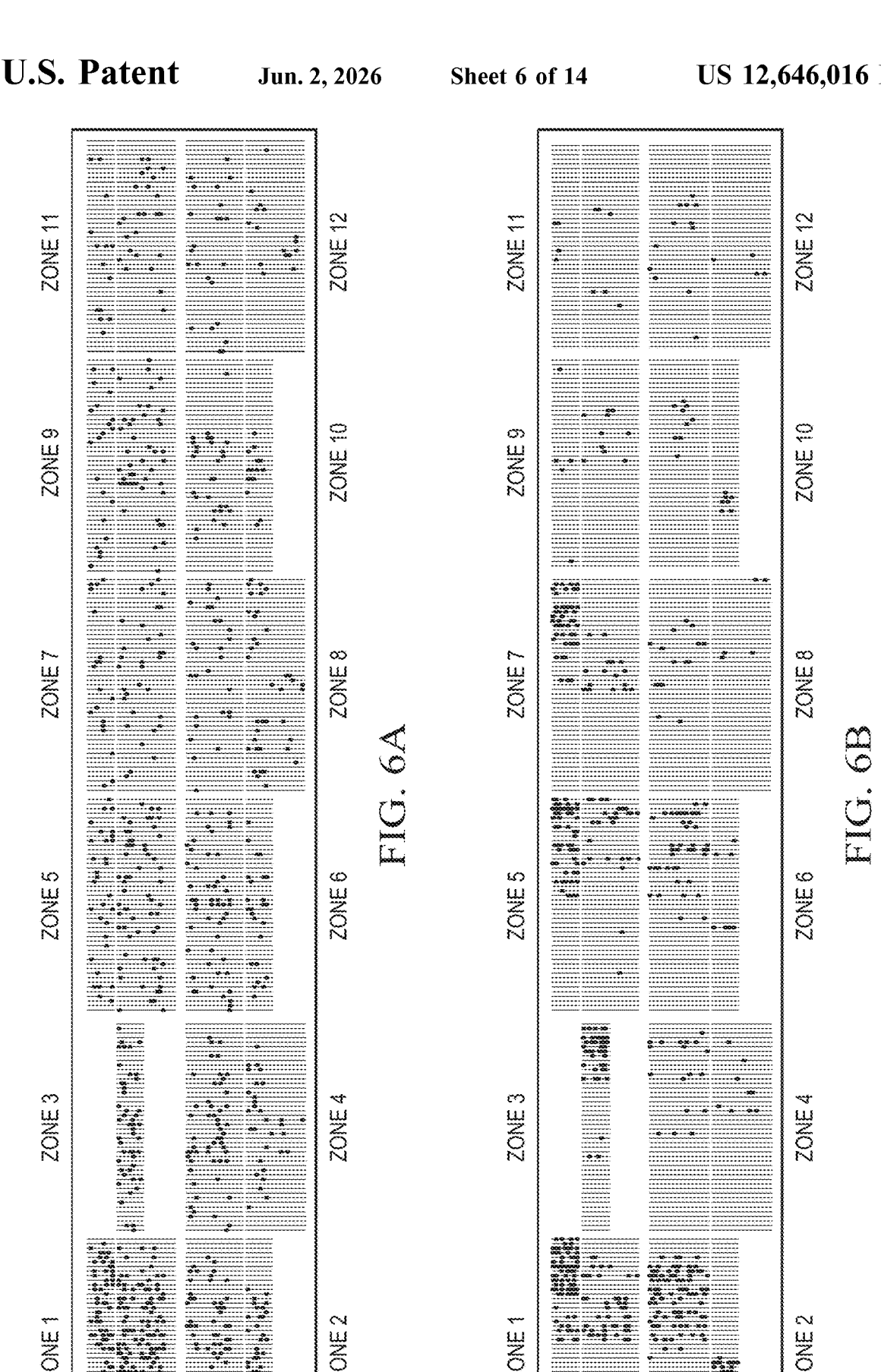
FIGS. 6A-6B illustrate one example of the improvement in order picking that is achievable through use of exemplary order allocation and order grouping optimization methodologies according to the general inventive concept.

FIGS. 6A-6B further illustrate the improvement in order picking efficiency that is achievable through use of combined exemplary order allocation and order grouping optimization methodologies according to the general inventive concept.

FIG. 6A schematically depicts an exemplary warehouse layout that includes 12 pick zones (Zones 1-12), with adjacent pick zones (e.g., Zones 1 and 2, Zones 1 and 3, Zones 2 and 4, Zones 3 and 4, et seq.) separated by intersecting primary walkways. As shown, one or more secondary walkways may further separate a given pick zone. Within each pick zone are multiple aisles of stored products, which may reside on/in shelves, racks, bins, etc. As with the warehouse examples associated with the previous drawing figures, a given product may be stored at more than one location within a given pick zone or across multiple pick zones. To navigate the exemplary warehouse while picking orders, a picker must travel horizontally along the length of the warehouse and across the aisles, and also vertically within/along the aisles.

The dots populating the various pick zones of FIG. 6A represent all of the picking locations that must be visited by a picker to fulfill 300 exemplary orders of multiple items from a larger overall pool of open orders, as determined according to known order allocation and order grouping techniques. As may be observed, because known order picking techniques are based on FCFS and/or other non-optimized methodologies, the number of required individual picking locations is substantial across Zones 1-12. Picking the 300 exemplary orders requires the picker not only to traverse the length of the warehouse (i.e., from Zone 1 to Zone 12), but to also traverse the length of a majority of the aisles within each of said zones.

FIG. 6B illustrates the picking locations required to pick 300 orders from the same overall pool of open orders of the same warehouse shown in FIG. 6A when exemplary order allocation and order grouping optimization methodologies according to the general inventive concept are combined to optimize the picking operation. As in FIG. 6A, the dots appearing in FIG. 6B represent the picking locations that must be visited by a picker to fulfill the 300 exemplary orders.

As may be readily observed upon comparison of FIG. 6B to FIG. 6A, application of the exemplary order allocation and order grouping optimization methodologies greatly reduces the number of aisles that must be visited to pick the 300 exemplary orders. More specifically, in this particular example, order allocation and order grouping optimization results in a 32% reduction in the number of aisles that must be visited, a 34% reduction in required picker travel distance, 5% fewer stops, and a 40% increase in the number of units picked per hour. Thus, it should be apparent that picking efficiency is significantly increased and picker fatigue is significantly reduced through application of exemplary order allocation optimization and order grouping optimization processes described herein.

Exemplary warehouse picking optimization systems are modular in nature—meaning that a warehouse picking optimization system may easily and unobtrusively be integrated with an already existing warehouse management system (WMS) of a warehouse of interest. A schematic hardware diagram representing one exemplary and typical warehouse management system with which an exemplary warehouse picking optimization system has been associated is presented in FIG. 7.

Figure 7:
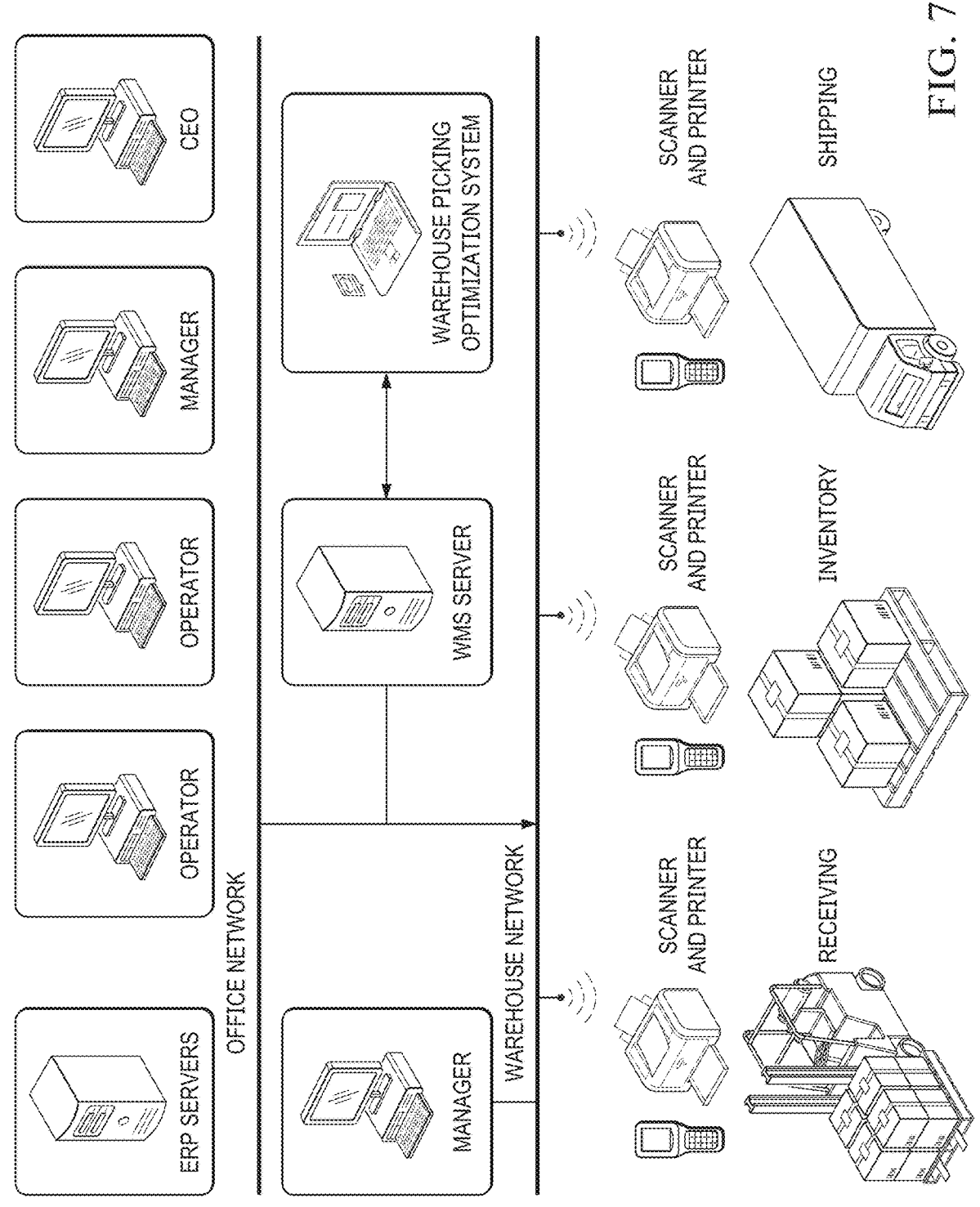
FIG. 7 is a hardware diagram representing one exemplary warehouse order picking optimization system according to the general inventive concept.

As shown in FIG. 7 and as would be familiar to one of skill in the art, the exemplary existing warehouse management system includes an office-side network and a warehouse-side network, whereby information, instructions, etc., may be passed from the office to the warehouse. To this end, the office-side network may include one or more servers, which servers may communicate with a multitude of databases and on which may run enterprise resource planning software, etc. The office-side network may also have associated therewith one or more system operators, a manager(s), a company CEO, etc.

The warehouse-side network may similarly include various hardware, software and personnel. As shown, the exemplary warehouse includes a warehouse management system comprising one or more servers running warehouse management system software. A system/warehouse manager(s) may also reside at the warehouse level. As would be understood by one of skill in the art, the warehouse management system supports the day-to-day operations of the warehouse and, therefore, receives and stores data related to product inventory, product locations, labor, etc. The warehouse management system typically communicates in a wireless manner with warehouse floor level devices such as dock, forklift and/or handheld scanners, printers and other devices that are used to perform various tasks in different parts of the warehouse.

As further schematically represented in FIG. 7, the warehouse employs an exemplary warehouse picking optimization system. Rather than requiring integration into the existing warehouse management system, the warehouse picking optimization system is modular in nature, which allows the existing warehouse management system to operate whether or not the warehouse picking optimization system is present. For example, the warehouse picking optimization system may be embodied in a programmed computing device(s) such as a laptop or desktop computer that is located on the warehouse floor and placed in communication with the existing warehouse management system, and which executes computer-readable instructions within the programming to perform the above-described order allocation optimization and/or order grouping optimization processes.

Communication between the warehouse picking optimization system and the warehouse management system provides the warehouse picking optimization system with access to information regarding inventory levels, product location, and to other various data relevant to performing order allocation optimization and/or order grouping optimization. As described in more detail below, communication between the warehouse picking optimization system and the warehouse management system also allows the warehouse picking optimization system to transmit information and/or instructions to the warehouse management system.

An exemplary warehouse picking optimization system preferably includes a user interface, such as a graphical user interface, that allows a user to interact with the warehouse picking optimization system. For example, since operational constraints dictated by a given warehouse operation typically require orders to be picked separately based on certain criteria, such as but not limited to storage zone, order destination and required material handling equipment, a supervisor (e.g., the warehouse-side manager of FIG. 7) may use the system user interface to monitor open orders based on said operational constraints. As such operational constraints typically vary site by site, the user interface may be customized for a given warehouse site to guarantee that the warehouse picking optimization system does not violate any site-specific operational constraints and can be used in the most efficient manner.

Figure 8:
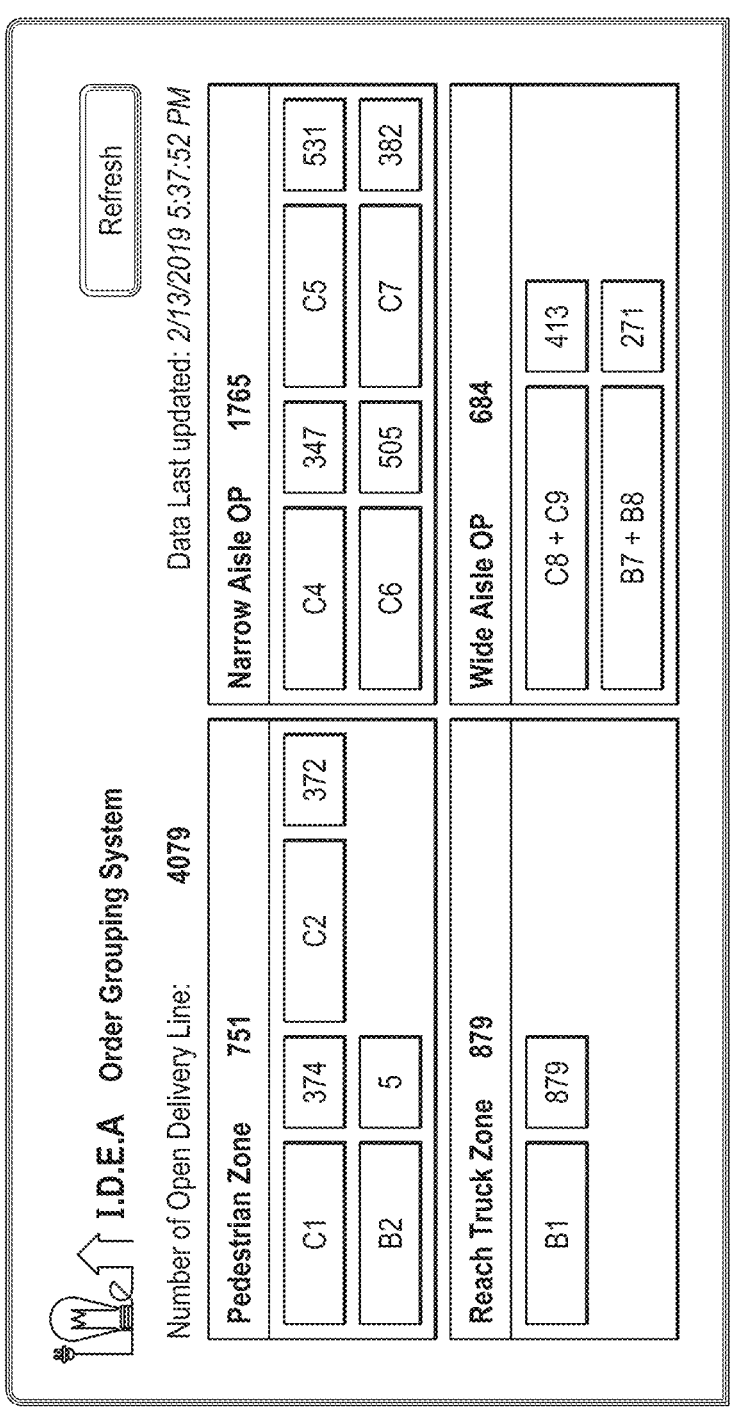
FIG. 8 represents the ability of an exemplary warehouse picking optimization system to permit order grouping optimization to be applied to only user-selected order categories.

One exemplary warehouse picking optimization system user interface screen and associated exemplary system functionality is represented in FIG. 8. The user interface of FIG. 8 allows a user to, for example, apply order grouping optimization to only a selected category or categories of open orders. As shown, a user may observe via the exemplary user interface screen that there are currently 4,079 open orders waiting to be picked in the warehouse. These 4,079 open orders may be separated by the system into multiple categories (4 in this example) depending on the storage zone (e.g., "Pedestrian Zone", "Reach Truck Zone", "Narrow Aisle OP", "Wide Aisle OP") in which order items to be picked reside. The exemplary interface screen also informs the user that of the 4,079 open orders, 751 reside in the Pedestrian Zone, 1,765 reside in the Narrow Aisle OP, 879 reside in the Reach Truck Zone and 684 reside in the Wide Aisle OP.

The exemplary user interface screen of FIG. 8 also illustrates that an exemplary warehouse picking optimization system and method may be operative to further separate a storage zone into subcategories comprising the various storage locations within the storage zone that contain the open orders. For example, the Pedestrian Zone is shown to include three storage area subcategories—C1, C2 and B2—with storage area C1 accounting for 374 of the 751 open orders, storage area C2 accounting for 372 of the 751 open orders and storage area B2 accounting for 5 of the 751 open orders. Selecting one or more of the C1, C2 and/or B2 screen buttons, will cause the warehouse picking optimization system to apply order grouping optimization to the associated subcategory of open orders and to thereafter generate tasks for the selected subcategory of open orders.

As would be understood by one of skill in the art, various warehouse operational constraints will typically need to be considered before applying order grouping optimization. In this regard, another exemplary warehouse picking optimization system user interface screen and associated exemplary system functionality is represented in FIG. 9.

The user interface screen and exemplary system functionality represented in FIG. 9 further categorizes open orders according to picking constraints and allows a user to consider the picking constraints before applying order grouping optimization. For example, if the user considering the various open orders shown in FIG. 8 wants to apply order grouping optimization and to generate a task for the 413 open orders associated with combined storage areas C8+C9 within the "Wide Aisle OP" zone, the user can see from the screen of FIG. 9 that three of the 413 open orders are designated as "Pure Heavy" orders, meaning that those orders must be picked by material handling equipment in the form of a reach truck. As also revealed by the screen of FIG. 9, the remaining 410 open orders in combined storage areas C8+C9 of the "Wide Aisle OP" zone are designated as "Mix/Light Pick" orders, meaning those orders can be picked by material handling equipment in the form of an order picker (and a reach truck if needed).

The system user can use the additionally presented picking constraint information about the open orders in combined storage areas C8+C9 and knowledge of the current status of operations on the warehouse floor to select one of the "Pure Heavy" or "Mix/Light Pick" open order categories for application of order grouping optimization and task generation. For example, if there is only one (human) picker currently available but that picker can drive a reach truck but not an order picker, then the presented information would lead the user to apply order grouping optimization to the "Pure Heavy" open order category and to cause the generation of the appropriate task for that category. The application of order grouping optimization may be initiated by selecting the "Pure Heavy" screen button on the user interface screen.

Another exemplary warehouse picking optimization system user interface and exemplary system functionality is represented in FIG. 10. The user interface screen and exemplary system functionality represented in FIG. 10 categorizes open orders by priority level, which may also be used as a deciding factor regarding in the process of applying order grouping optimization.

In the particular example of FIG. 10, there are three priority levels—"Criticality 1", "Criticality 2" and "Criticality 3"—with Criticality 1 having priority over Criticality 2 and Criticality 2 having priority over Criticality 3. As indicated, there are currently 130 open orders which contain a total of 236 picks (order lines). In this case, 78 open orders comprising 134 picks are categorized as Criticality 1 level orders, 20 open orders comprising 43 picks are categorized as Criticality 2 level orders, and 32 open orders comprising 59 picks are categorized as Criticality 3 level orders. A user can apply order grouping optimization to and generate tasks for any one or more of the Criticality 1, Criticality 2 and/or Criticality 3 level open orders by selecting the associated "Check" button(s) on the user interface screen.

Figure 11:
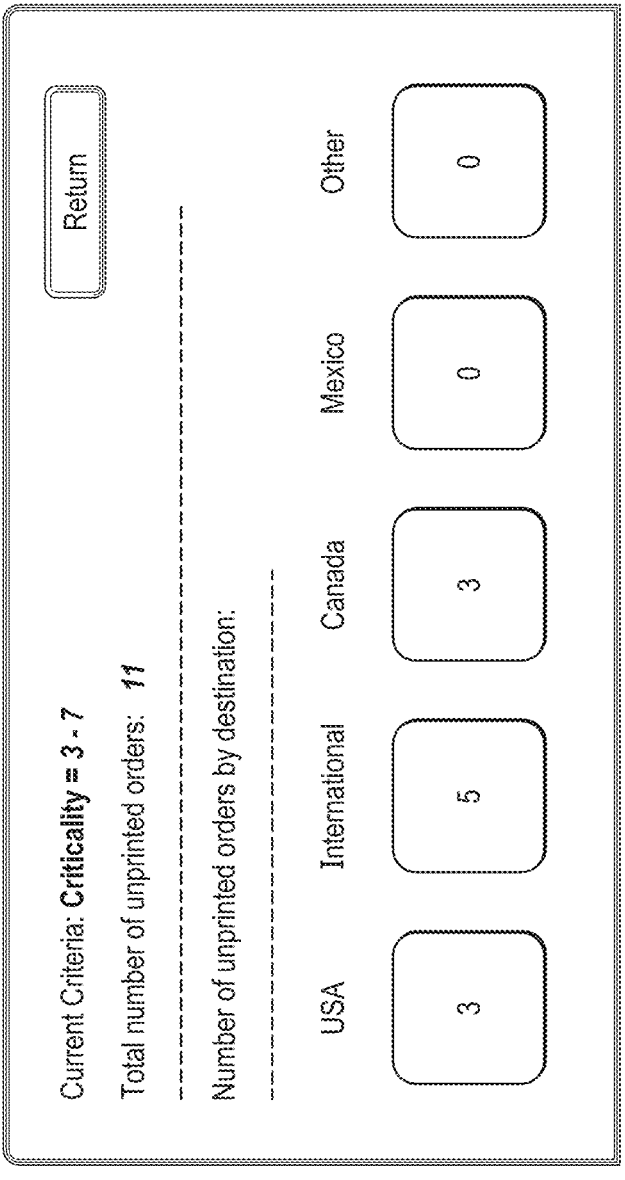
FIG. 11 illustrates how orders with the same criticality can also be further separated based on destination before order grouping optimization is applied.

Yet another exemplary warehouse picking optimization system user interface and exemplary system functionality is illustrated in FIG. 11. Particularly, FIG. 11 demonstrates that order grouping decisions may also be guided by the criticality of a group of open orders. In this particular example, a user would have previously elected to focus on open orders having Criticality levels between 3-7. The user is thus subsequently presented with the screen of FIG. 11, where all of the Criticality 3-7 open orders are further separated by intended destination. In this example, there are eleven open orders having a Criticality level between 3 and 7. Of these eleven open orders, three are destined for the USA, three are destined for Canada, and five are destined for other international locations. It can be seen that other possible destinations in this example include "Mexico" and "Other". From the exemplary screen of FIG. 11, the user may use order destination to determine which of the Criticality 3-7 level open orders will have order grouping optimization applied thereto and, consequently, for which of said open orders a task will be generated.

As described above, and as should be apparent to one of skill in the art, a primary function of an exemplary system and method embodiment according to the general inventive concept is to provide optimized picking instructions to guide pickers in real-world picking operations. Such functionality is represented in FIGS. 12-15.

As used herein above, and below, a "picker" may be a human picker, a mechanical picker, or a combination of a human picker and a mechanical picker. It is well understood and typical to employ humans to pick orders in a warehouse setting. However, mechanical picking—e.g., order picking through use of some form of automated picking equipment—is also becoming more commonplace.

Exemplary systems and methods described herein may be used to provide optimized order picking instructions to human pickers and/or automated picking equipment. The automated picking equipment used may be of different types and may provide different levels of picking ability.

In one exemplary embodiment, a warehouse order picking optimization system and method may provide task information and optimized picking instructions to one or a multitude of automated trolleys. An automated trolley as used here is essentially a self-propelled robotic cart. In an exemplary application, a number of automated trolleys are deployed in a warehouse of interest, and move automatically through the warehouse, stopping at different points where items to be picked are located. A human picker may accompany a given automated trolley and work in conjunction with the trolly to complete a given picking task. Alternatively, the trolleys (or some of the trolleys) may work autonomously, waiting at various stopping points until a human picker passes by and picks the item for which the trolley is waiting—which may mean simply taking the item from a bin and depositing it in a receptacle or other designated area on the trolley. In either case, the item to be picked may be indicated on a screen or other display element of the automated trolley, and/or on a handheld device carried by the human picker, which may also be used to scan the item.

When a human picker accompanies an automated trolly, the trolley may store and display task information and/or optimized picking information that might otherwise be provided to the human picker on task sheets and pick tickets. Consequently, when an automated trolley is used with an exemplary system and method according to the invention, the trolley may guide a human picker through an optimized picking task along an optimized picking path.

Regardless of whether a human picker accompanies an automated trolley or a trolley operates alone and waits as necessary for human assistance, the tasks performed by the trolley and the optimized picking path followed by the trolley are provided to the trolley, directly or indirectly, by a warehouse order picking optimization system of the invention. The warehouse order picking optimization system is aware of, for example, the nature, number and zones of travel of the various automated trolleys available and, after performing the desired order allocation optimization and/or order grouping optimization functions described above, generates tasks and optimized picking instructions that define how the orders should be picked, and transmits the required task and picking information to one or more of the trolleys. The task and picking information serves as instructions that cause the one or more of the automated trolleys to initiate a picking operation utilizing optimized picking assignments, as described above.

In another exemplary embodiment, a warehouse order picking optimization system and method may provide task information and optimized picking instructions to other types of automated picking equipment. For example, a warehouse order picking optimization system and method may provide task information and optimized picking instructions to a collaborative robot—commonly referred to as a "cobot"—that is designed to share space with and interact with a human picker as would be understood by one of skill in the art. One or a multitude of cobots could be configured to travel between different picking locations throughout a warehouse, a cobot may be located at each item storage location or in a location from which a single cobot has access to several item storage locations, or a cobot may be configured to accompany a human picker along an optimized picking path.

In either case, an exemplary warehouse order picking optimization system generates tasks and optimized picking instructions that define how the orders should be picked, and transmits the required task and picking information to one or more cobots, in much the same manner as described above with respect to automated trolleys. The task and picking information similarly serves as instructions that cause the one or more of the cobots to assist with an optimized picking operation.

Additionally, it is also possible that a warehouse order picking optimization system and method may provide task information and optimized picking instructions to more highly automated picking equipment. For example, warehouse order picking optimization systems and methods may provide task information and optimized picking instructions to fully automated (e.g., robotic) picking equipment that has the ability to pick items from different picking locations within a warehouse without human assistance. Such a system may include robotic carts that follow physical or visual paths or that travel on vertical or overhead gantries, etc., and include end effectors or other devices necessary to retrieve items to be picked. In such an embodiment, the warehouse order picking optimization system is aware of, for example, the nature, number and zones of travel of the various robotic pickers and, after performing the desired order allocation optimization and/or order grouping optimization functions described above, generates tasks and optimized picking instructions that define how the orders should be picked, and transmits the required task and picking information to one or more of the robotic pickers. The task and picking information serves as instructions that cause the one or more of the robotic pickers to pick orders employing optimized picking assignments.

Figure 12:
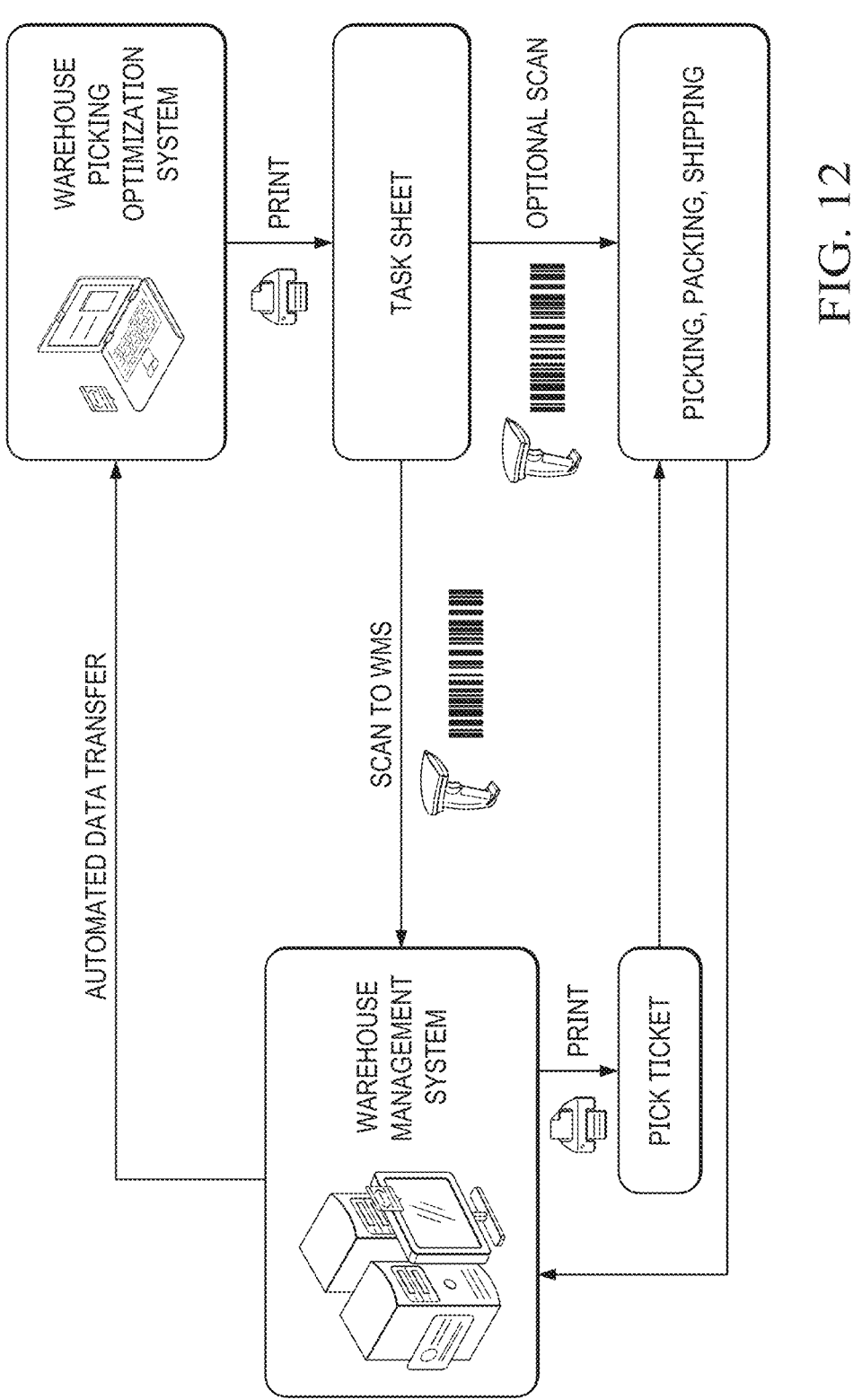
FIG. 12 is a graphical representation of one exemplary warehouse order picking optimization process according to the general inventive concept.

Referring now to FIG. 12, a process flow diagram that schematically illustrates one exemplary process of generating optimized tasks and picking instructions may be observed. As explained previously, an exemplary warehouse picking optimization system is associated with and communicates with the existing warehouse management system of the warehouse of interest, but is preferably modular in nature and not integrated into the warehouse management system. The warehouse picking optimization system obtains from or through the warehouse management system whatever information (e.g., inventory, product location, etc.) is necessary to perform order allocation optimization and/or order grouping optimization. As indicated, the exchange of information between the warehouse management system and the warehouse picking optimization system may occur via an automated data transfer.

Once the warehouse picking optimization system performs the desired order allocation optimization and/or order grouping optimization functions on selected open orders or on all currently existing open orders, the warehouse picking optimization system generates an optimized task or tasks defining how the orders should be picked. In this particular example, the task(s) is printed as a task sheet having a barcode(s) that may be scanned using a barcode scanner (e.g., a handheld) barcode scanner. As shown, another barcode scan may optionally also be performed, such as to collect information for other purposes (e.g., recordkeeping, performance evaluation, etc.) that are unrelated to providing optimized picking instructions to the warehouse management system.

The scanned task sheet information is transmitted to the warehouse management system and instructs the warehouse management system how to generate the picking assignments required to fulfill the open orders in the optimized manner determined by the warehouse picking optimization system. In this example, optimized picking assignments are provided by the warehouse management system in the form of printed pick tickets. As would be obvious to one of skill in the art, in lieu of or in addition to printing pick tickets, optimized picking assignments may be uploaded to mobile devices used by or owned by the pickers. In any case, the optimized picking assignments provide the picker(s) with optimized picking instructions that allow the picker(s) to pick the open orders in the most efficient manner possible.

Figure 13:
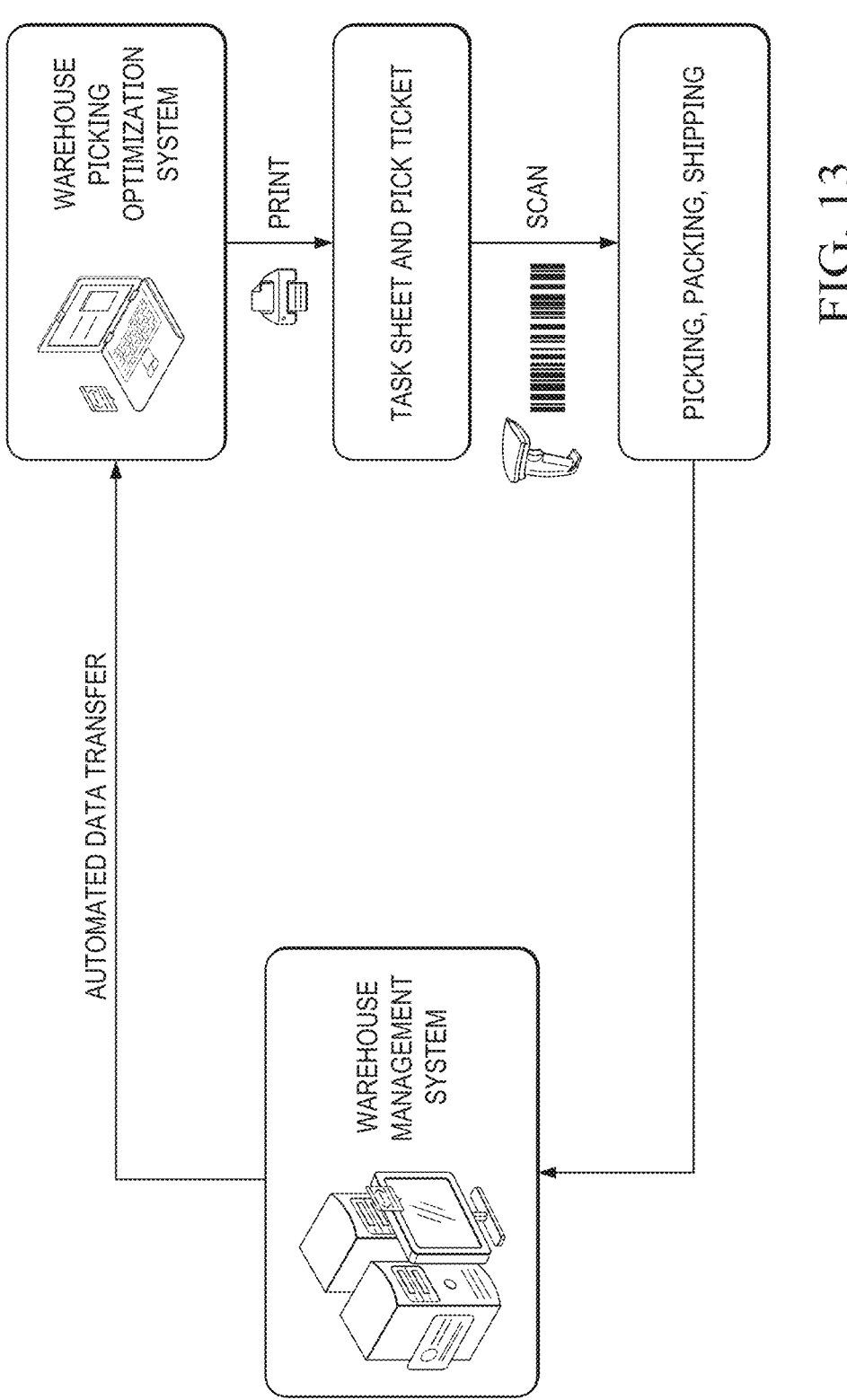
FIG. 13 is a graphical representation of another exemplary warehouse order picking optimization process according to the general inventive concept.

FIG. 13 is a process flow diagram that schematically illustrates an exemplary alternative process of generating optimized picking instructions. As shown in FIG. 13, an exemplary warehouse picking optimization system is again associated (preferably in a modular manner) with an existing warehouse management system of the warehouse of interest. As in the process of FIG. 12, the warehouse picking optimization system again obtains from or through the warehouse management system whatever information is necessary to perform order allocation optimization and/or order grouping optimization. As indicated, the exchange of information between the warehouse management system and the warehouse picking optimization system may again occur via an automated data transfer.

Once the warehouse picking optimization system performs the desired order allocation optimization and/or order grouping optimization functions on selected open orders or on all currently existing open orders, the warehouse picking optimization system according to this alternative exemplary process generates both the optimized task or tasks defining how the orders should be picked and the optimized picking assignments for those orders. In other words, according to the exemplary optimization process flow represented in FIG. 13, use of the warehouse management system is not required in order to generate optimized picking assignments.

In the particular example represented in FIG. 13, the task(s) is provided in the form of a printed task sheet having a barcode(s) that may be scanned using a barcode scanner (e.g., a handheld). Likewise, the picking assignments required to fulfill the open orders in the optimized manner determined by the warehouse picking optimization system are provided in the form of printed pick tickets. As would be obvious to one of skill in the art, in lieu of or in addition to printing task sheets and/or pick tickets, task sheets and optimized picking assignments may instead be uploaded to mobile devices used by or owned by the pickers. Also, as in the process of FIG. 12, a barcode scan of the task sheet(s) may optionally be performed to collect various types of information for various purposes related to warehouse operations. In any case, the optimized picking assignments are again used to provide the picker(s) with optimized picking instructions that allow the picker(s) to pick the open orders in the most efficient manner possible.

Figure 14:
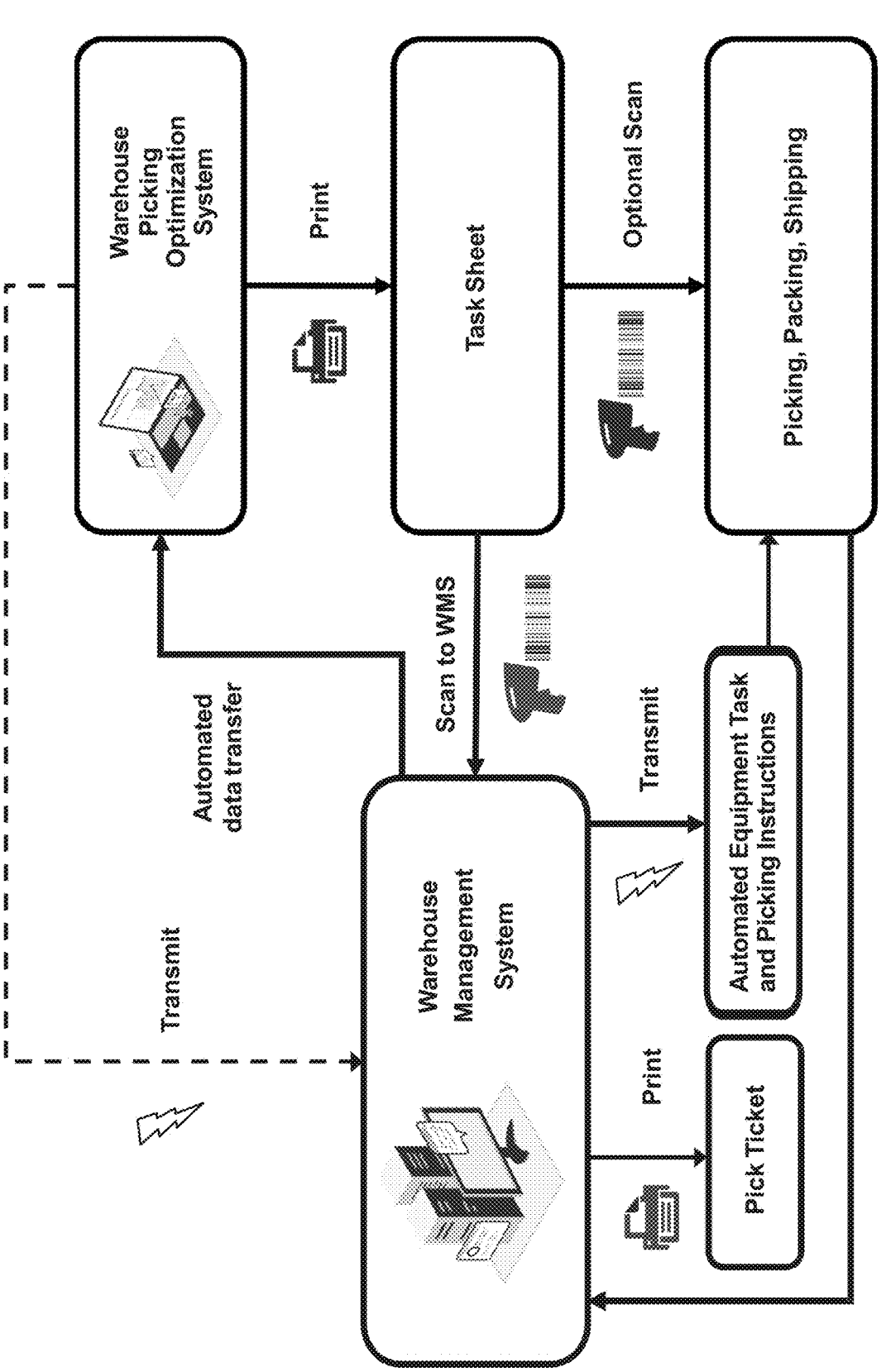
FIG. 14 is a graphical representation of yet another exemplary warehouse order picking optimization process according to the general inventive concept.

FIGS. 14-15 are process flow diagrams that schematically illustrate further alternative exemplary processes of generating optimized tasks and picking instructions. The process represented in FIG. 14 is similar to the process represented in FIG. 12, in that the warehouse management system is used to generate optimized tasks and picking assignments. Similarly, the process represented in FIG. 15 is similar to the process represented in FIG. 13, in that the warehouse picking optimization system is used to generate optimized task and picking assignments instead of the warehouse management system. However, unlike the process represented in FIGS. 12-13, the processes represented in FIGS. 14-15 result in optimized task and picking assignment instructions being electronically transmitted to automated picking equipment that is configured to assist with, or perform, the required picking tasks.

Referring now particularly to FIG. 14, it may be observed that an exemplary warehouse picking optimization system is again associated with and communicates with the existing warehouse management system of the warehouse of interest. The warehouse picking optimization system may again be modular in nature and not integrated into the warehouse management system. The warehouse picking optimization system obtains from or through the warehouse management system whatever information (e.g., inventory, product location, etc.) is necessary to perform order allocation optimization and/or order grouping optimization. As indicated, the exchange of information between the warehouse management system and the warehouse picking optimization system may occur via an automated data transfer.

As in the exemplary process embodiment of FIG. 12, once the warehouse picking optimization system performs the desired order allocation optimization and/or order grouping optimization functions on selected open orders or on all currently existing open orders, the warehouse picking optimization system generates an optimized task or tasks defining how the orders should be picked. As shown, the task may again be printed as a task sheet having a barcode(s) that may be scanned using a barcode scanner (e.g., a handheld) barcode scanner. Another barcode scan may optionally also be performed, such as to collect information for other purposes (e.g., recordkeeping, performance evaluation, etc.) that are unrelated to providing optimized picking instructions to the warehouse management system.

The scanned task sheet information is again transmitted to the warehouse management system and instructs the warehouse management system how to generate the picking assignments required to fulfill the open orders in the optimized manner determined by the warehouse picking optimization system. According to the exemplary process of FIG. 14, optimized picking assignments are electronically transmitted by the warehouse management system in the form of understandable (e.g., machine readable) and actionable instructions to one or more pieces of automated picking equipment—such as the one or more types of automated equipment described above.

In an indicated variation of the process represented in FIG. 14, once the warehouse picking optimization system performs the desired order allocation optimization and/or order grouping optimization functions on selected open orders or on all currently existing open orders, and generates an optimized task or tasks defining how the orders should be picked, the warehouse picking optimization system may transmit the optimized task information directly to the warehouse management system instead of printing scannable task sheets. The transmitted task information instructs the warehouse management system how to generate the picking assignments required to fulfill the open orders in the optimized manner determined by the warehouse picking optimization system. Such a process variation may be preferable and/or more efficient, for example, when the subsequent optimized picking operation will be performed without a human picker(s).

In either case, the warehouse management system uses received optimized task information to provide optimized picking assignments to the automated equipment. In the case where all picking will be performed by the automated equipment, it may be unnecessary to print the pick tickets described with respect to previous embodiments. However, in the case where picking will be performed by a combination of human pickers and automated equipment, the warehouse management system may also print pick tickets (not shown in FIG. 14) containing picking assignments in addition to electronically transmitting picking assignments to the automated picking equipment. The optimized picking assignments conveyed by the warehouse management system provide the automated picking equipment and any involved human picker(s) with optimized picking instructions that direct the picking of open orders in the most efficient manner possible, and also initiate action by the automated picking equipment.

As in previous exemplary embodiments, in lieu of or in addition to printing pick tickets, optimized picking assignments intended for human pickers may be uploaded to mobile devices used by or owned by said pickers.

Referring now particularly to FIG. 15, it may be observed that an exemplary warehouse picking optimization system is again associated with and communicates with the existing warehouse management system of the warehouse of interest. The warehouse picking optimization system may again be modular in nature and not integrated into the warehouse management system. The warehouse picking optimization system obtains from or through the warehouse management system whatever information (e.g., inventory, product location, etc.) is necessary to perform order allocation optimization and/or order grouping optimization. As indicated, the exchange of information between the warehouse management system and the warehouse picking optimization system may occur via an automated data transfer.

As in the exemplary process embodiment of FIG. 13, once the warehouse picking optimization system performs the desired order allocation optimization and/or order grouping optimization functions on selected open orders or on all currently existing open orders, the warehouse picking optimization system according to this alternative exemplary process generates both an optimized task(s) defining how the orders should be picked and optimized picking assignments for those orders. In other words, according to the exemplary optimization process flow represented in FIG. 15, use of the warehouse management system is not required in order to generate optimized picking assignments.

As shown in FIG. 15, task information is used by the warehouse picking optimization system to create optimized picking assignments. The optimized picking assignments are electronically transmitted by the warehouse picking optimization system in the form of understandable (e.g., machine readable) and actionable instructions to one or more pieces of automated picking equipment—such as one or more types of automated picking equipment described above.

In an indicated variation of the process represented in FIG. 15, the warehouse picking optimization system may print optimized task and picking information in addition to electronically transmitting picking assignments to the automated equipment. The printed information may again take the form of task sheets and pick tickets having barcodes that may be scanned using a barcode scanner (e.g., a handheld) barcode scanner.

The printing of task sheets and pick tickets may be useful in cases where picking will be performed by a combination of human pickers and automated equipment. When task sheets and pick tickets are printed, another barcode scan may optionally also be performed, such as to collect information for other purposes (e.g., recordkeeping, performance evaluation, etc.) that are unrelated to providing optimized picking instructions to the automated equipment. As in previous exemplary embodiments, in lieu of or in addition to printing pick tickets, optimized picking assignments intended for human pickers may be uploaded to mobile devices used by or owned by said pickers.

In any case, the optimized picking assignments conveyed by the warehouse picking optimization system provide the automated picking equipment and any involved human picker(s) with optimized picking instructions that direct the picking of open orders in the most efficient manner possible.

While certain embodiments of the general inventive concept are described in detail above, the scope of the general inventive concept is not considered limited by such disclosure, and modifications are possible without departing from the spirit thereof as evidenced by the following claims:

What is claimed is:

1. A method of optimizing the picking of open orders in a warehouse divided into zones, each order including one or more items and each item associated with a particular location in the warehouse, the method comprising:

storing in one or more memories an active inventory information file indicating the quantity of all items in the warehouse by physical location, and an open order file indicating the quantity of each item required by each order in an order queue;

retrieving, via one or more processors, item inventory, item location, and open order item information from the one or more memories;

generating, with the one or more processors, pick assignments whose items are located as close as possible to each other so as to minimize picking travel distance, by:

(a) determining the frequency that each location of items to be picked will need to be visited to pick all of the individual open orders, (b) determining the location that will be the most frequently visited pick location, (c) after determining the most frequently visited pick location, generating a vector that calculates the additional travel distance required to visit any new pick location as a result of adding a new order to a current pick assignment, (d) scoring each order by evaluating the additional travel distance resulting from adding the new order to the current pick assignment, (e) subsequent to scoring each order, selecting the order that results in the minimum travel distance and adding it to the current pick assignment, (f) updating the required location visits of the pick assignment each time an order is added to the current pick assignment, (g) each time a new order is added to the current pick assignment, updating the vector used to calculate the additional travel distance required for any new location visit resulting from adding the new order, and repeating steps (d)-(g) until the criteria of generating one order picking task has been met;

generating, with the one or more processors, an order picking task for automated picking equipment, the task including picking instructions for the group of eligible open orders, the picking instructions identifying each of the product storage locations that must be picked in order to fulfill the eligible open orders associated with the task;

transmitting order picking task information to automated picking equipment; and commanding the automated picking equipment to undertake an order picking operation using the optimized order picking instructions.

2. The method of claim 1, wherein:

step (a) comprises abstracting the open orders into multi-dimensional vectors based on the locations of the products that need to be picked to complete each order;

the dimension of the vector is equal to the number of active pick locations; and the binary value of the vectors denotes the location of the picks, where 0 indicates no item at the location and 1 indicates an item to be picked from the location.

3. The method of claim 1, wherein:

step (c) comprises generating a calibration vector for each location vector of a current task; and the value of each element in the calibration vector simulates the increased travel distance required if a new pick at a given location is added to the current task.

4. The method of claim 1, wherein:

the similarity between the pick locations of the current task and those of a task associated with another given order are calculated by the one or more processors as the dot product of the calibration vector and the order location vector.

5. The method of claim 1, wherein:

the transmitting of the order picking task information to the automated equipment is performed by the one or more processors.

6. The method of claim 1, wherein:

the method further comprises transmitting, with the one or more processors, the order picking task information to a warehouse management system that is interposed in a communication path between the one or more memories and the one or more processors; and the transmitting of the order picking task information to the automated equipment is performed by the warehouse management system.

7. The method of claim 1, wherein the step of generating pick assignments is selectively applied to at least one of:

only a category or categories of open orders;

open orders whose picks are located within a certain storage area or certain storage areas;

open orders based on constraints selected from the group consisting of product size, product weight, the availability of material handling equipment, and combinations thereof; and open orders having a certain criticality level or range of criticality levels.

8. A system for optimizing the picking of open orders of items located within a warehouse divided into zones, comprising:

one or memories storing:

an active inventory file indicating the quantity of all items in the warehouse by location, and an open order file indicating the quantity of each item required by each order in an order queue;

one or more processors in communication with the one or more memories, the one or more processors including computer-executable instructions that when executed by one or more processors cause the one or more processors to:

perform order allocation optimization by:

(a) determining the frequency that each location of items to be picked will need to be visited to pick all of the individual open orders, (b) determining the location that will be the most frequently visited pick location, (c) after determining the most frequently visited pick location, generating a vector that calculates the additional travel distance required to visit any new pick location as a result of adding a new order to a current pick assignment, (d) scoring each order by evaluating the additional travel distance resulting from adding the new order to the current pick assignment, (e) subsequent to scoring each order, selecting the order that results in the minimum travel distance and adding it to the current pick assignment, (f) updating the required location visits of the pick assignment each time an order is added to the current pick assignment, (g) each time a new order is added to the current pick assignment, updating the vector used to calculate the additional travel distance required for any new location visit resulting from adding the new order, and repeating steps (d)-(g) until the criteria of generating one order picking task has been met;

generate an order picking task for automated picking equipment, the task including picking instructions for the open orders to which order grouping optimization has been applied, the picking instructions identifying each of the product storage locations that must be picked in order to fulfill the open orders associated with the one or more tasks and useable by the automated picking equipment to fulfill the open orders;

a warehouse management system that is interposed in a communication path between the one or more memories and the one or more processors, wherein the warehouse management system is configured to transmit a command that causes the automated equipment to undertake an order picking operation using the optimized order picking instructions.

9. The system of claim 8, further comprising:

a printer in communication with the warehouse management system that is configured to print a pick ticket, the pick ticket comprising information pertaining to a pick assignment.

10. The system of claim 8, further comprising:

a printer in communication with the one or more processors that is configured to print a task sheet, the task sheet comprising at least one barcode storing information pertaining to at least one optimized task that defines how an order should be picked; and a barcode scanner configured to read the at least one barcode and interpret the information stored therein.

11. The system of claim 10, wherein:

the barcode scanner is in communication with the warehouse management system that is configured to collect and transmit information about the warehouse to the warehouse management system.

12. The system of claim 8, further comprising:

a mobile device in communication with the warehouse management system that is configured to received optimized picking assignments from the warehouse management system.

13. The system of claim 8, further comprising a user interface that allows a user to perform at least one function selected from the group consisting of:

applying order grouping optimization to only a selected category or categories of open orders;

applying order grouping optimization to only a selected category of open orders having a particular picking constraint;

separating a warehouse zone into subcategories comprising the various storage locations within the storage zone that contain items for filling the open orders;

applying order grouping optimization to only a selected priority level or priority levels of open orders; and applying order grouping optimization to only a selected criticality level or criticality levels of a group of open orders.

14. The system of claim 8, wherein the automated picking equipment is selected from the group consisting of an automated trolley, a collaborative robot, and a robot.

15. A system for optimizing the picking of open orders of items located within a warehouse divided into zones, comprising:

one or memories storing:

an active inventory file indicating the quantity of all items in the warehouse by location, and an open order file indicating the quantity of each item required by each order in an order queue;

one or more processors in communication with the one or more memories, the one or more processors including computer-executable instructions that when executed by one or more processors cause the one or more processors to:

perform order allocation optimization by:

(a) determining the frequency that each location of items to be picked will need to be visited to pick all of the individual open orders, (b) determining the location that will be the most frequently visited pick location, (c) after determining the most frequently visited pick location, generating a vector that calculates the additional travel distance required to visit any new pick location as a result of adding a new order to a current pick assignment, (d) scoring each order by evaluating the additional travel distance resulting from adding the new order to the current pick assignment, (e) subsequent to scoring each order, selecting the order that results in the minimum travel distance and adding it to the current pick assignment, (f) updating the required location visits of the pick assignment each time an order is added to the current pick assignment, (g) each time a new order is added to the current pick assignment, updating the vector used to calculate the additional travel distance required for any new location visit resulting from adding the new order, and repeating steps (d)-(g) until the criteria of generating one order picking task has been met;

generate an order picking task for automated picking equipment, the task including picking instructions for the open orders to which order grouping optimization has been applied, the picking instructions identifying each of the product storage locations that must be picked in order to fulfill the open orders associated with the one or more tasks and useable by the automated picking equipment to fulfill the open orders; and transmit order picking task information to the automated picking equipment, the order picking task information including a command that causes the automated equipment to undertake an order picking operation using the optimized order picking instructions.

16. The system of claim 15, further comprising:

a printer in communication with the one or more processors that is configured to print a pick ticket, each pick ticket comprising information pertaining to a pick assignment.

17. The system of claim 15, further comprising:

a printer in communication with the one or more processors that is configured to print a task sheet, the task sheet comprising at least one barcode storing information pertaining to at least one optimized task that defines how an order should be picked; and a barcode scanner configured to read the at least one barcode and interpret the information stored therein.

18. The system of claim 15, further comprising:

a mobile device in communication with the one or more processors that is configured to received optimized picking assignments from the one or more processors.

19. The system of claim 18, further comprising a user interface that allows a user to perform at least one function selected from the group consisting of:

applying order grouping optimization to only a selected category or categories of open orders;

applying order grouping optimization to only a selected category of open orders having a particular picking constraint;

separating a warehouse zone into subcategories comprising the various storage locations within the storage zone that contain items for filling the open orders;

applying order grouping optimization to only a selected priority level or priority levels of open orders; and applying order grouping optimization to only a selected criticality level or criticality levels of a group of open orders.

20. The system of claim 19, wherein the automated picking equipment is selected from the group consisting of an automated trolley, a collaborative robot, and a robot.

\* \* \* \* \*